(12) United States Patent
Saito et al.

(10) Patent No.: US 12,511,961 B2
(45) Date of Patent: Dec. 30, 2025

(54) ENTRY CONTROL DEVICE, ENTRY CONTROL SYSTEM, ENTRY CONTROL METHOD, AND NON-TRANSITORY COMPUTER-READABLE MEDIUM

(71) Applicant: NEC Corporation, Tokyo (JP)

(72) Inventors: Maya Saito, Tokyo (JP); Kouhei Okinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 42 days.

(21) Appl. No.: 18/280,607

(22) PCT Filed: Mar. 11, 2021

(86) PCT No.: PCT/JP2021/009744
§ 371 (c)(1),
(2) Date: Sep. 6, 2023

(87) PCT Pub. No.: WO2022/190310
PCT Pub. Date: Sep. 15, 2022

(65) Prior Publication Data
US 2024/0153326 A1 May 9, 2024

(51) Int. Cl.
*G06F 21/32* (2013.01)
*G07C 9/00* (2020.01)
(Continued)

(52) U.S. Cl.
CPC ......... *G07C 9/00563* (2013.01); *G06F 21/32* (2013.01); *G07C 9/37* (2020.01); *H04L 63/0861* (2013.01)

(58) Field of Classification Search
CPC ........ H04M 2203/553; H04M 2250/10; G16H 40/63; G08B 21/22; G08B 25/008;
(Continued)

(56) References Cited

U.S. PATENT DOCUMENTS

2002/0191817 A1 12/2002 Sato et al.
2010/0085152 A1 4/2010 Fukuda et al.
(Continued)

FOREIGN PATENT DOCUMENTS

EP 3739551 A1 11/2020
JP 2006-134081 A 5/2006
(Continued)

OTHER PUBLICATIONS

International Search Report for PCT Application No. PCT/JP2021/009744, mailed on May 18, 2021.
(Continued)

*Primary Examiner* — Dionne Pendleton
(74) *Attorney, Agent, or Firm* — Sughrue Mion, PLLC

(57) ABSTRACT

An entry control device according to the present disclosure includes: a first biometric authentication control unit that acquires first biometric information from a predetermined user who tries to enter a facility including a plurality of regions where entry is restricted in each of a plurality of locking systems, and controls first biometric authentication; an attribute information acquisition unit that acquires attribute information about the user when the authentication has succeeded; a registration unit that registers, in association with a patron in a storage device, second biometric information acquired from the user when an attribute of the user is an authorized user; a second biometric authentication control unit that acquires biometric information including the second biometric information from the user, and controls second biometric authentication; and an unlocking control unit that instructs unlocking to the locking system when the authentication has succeeded.

12 Claims, 14 Drawing Sheets

(51) Int. Cl.
*G07C 9/37* (2020.01)
*H04L 9/40* (2022.01)

(58) Field of Classification Search
CPC ... G08B 25/016; G08B 27/006; G07F 7/1008;
G07B 15/00; G06V 40/70; G06V
40/1365; G06V 40/19; G06V 40/197;
G06V 40/30; G06V 40/1306; G06V
40/1394; G06V 40/40; G06V 40/10;
G06V 40/165; G06Q 10/02; G06Q
20/341; G06Q 20/4014; G06Q 20/40145;
G06F 21/32; G06F 16/29; G06F 21/31;
G06F 21/30; G06F 21/35; G06F 21/42;
G06F 21/6245; G06F 2221/2111; G06F
2221/2137; G06F 21/34; G06F 21/602;
G06F 2221/2115; G07C 9/37; G07C
9/00563; G07C 9/38; G07C 2009/00769;
G07C 2209/02; G07C 2209/04; G07C
2209/08; G07C 2209/12; G07C 2209/14;
G07C 2209/62; G07C 9/00; G07C
9/00309; G07C 9/00571; G07C 9/22;
G07C 9/23; G07C 9/257; G07C 9/32;
G07C 9/33; G07C 2009/00325; G07C
2009/00547; G07C 2009/00793; H04W
12/06; H04W 12/64; H04W 12/08; H04W
12/68; H04W 4/021; H04W 12/30; H04W
12/63; H04W 4/02; H04W 4/026; H04W
4/029; H04W 4/12; H04W 4/14; H04W
4/80; H04W 4/90; H04W 88/02; H04L
63/0861; H04L 2209/80; H04L 2463/082;
H04L 63/08; H04L 63/107; H04L 9/3231;
H04L 63/0807; H04L 63/083; H04L
63/0853; H04L 63/10; H04L 63/102;
H04L 9/3213; H04L 9/3247; H04L
63/0838; H04L 63/0869; H04L 63/0884;
G06K 19/0723; G06K 7/10297; G06K
7/1417; B60R 16/037; B60R 25/2081;
B60R 25/25; B60R 25/252; B60W
2040/0809; B60W 40/08; B60W 2420/40;
B60W 2420/403; B60W 2540/043
See application file for complete search history.

(56) References Cited

U.S. PATENT DOCUMENTS

| 2012/0293642 | A1* | 11/2012 | Berini | G06V 40/197 |
| | | | | 348/77 |
| 2016/0125179 | A1 | 5/2016 | Bouatou et al. | |
| 2019/0073842 | A1* | 3/2019 | Lee | H04L 63/0853 |
| 2019/0340350 | A1* | 11/2019 | Campbell | G06F 21/32 |
| 2020/0357209 | A1 | 11/2020 | Kochi et al. | |
| 2021/0125444 | A1* | 4/2021 | Terry | G07C 9/28 |
| 2021/0211289 | A1* | 7/2021 | Lin | H04L 9/3213 |

FOREIGN PATENT DOCUMENTS

| JP | 2009-265769 A | 11/2009 |
| JP | 2010-092122 A | 4/2010 |
| JP | 2012-073963 A | 4/2012 |
| JP | 2018-151838 A | 9/2018 |
| JP | 2020-038545 A | 3/2020 |

OTHER PUBLICATIONS

Extended European Search Report for EP Application No. 21930163.7, dated on Mar. 15, 2024.

* cited by examiner

| USER ID | NAME | REGION IDENTIFICATION INFORMATION | REGION NAME | ATTRIBUTE | PERIOD IN WHICH STAY IS PERMITTED | VISITING PURPOSE |
|---|---|---|---|---|---|---|
| 1 | USER A | 511 | ROOM 511 | RESIDENT | | |
| 2 | USER B | 512 | ROOM 512 | RESIDENT | | |
| 3 | USER C | 513 | ROOM 513 | RESIDENT | | |
| 4 | USER D | 511 | ROOM 511 | AUTHORIZED USER | 2021/2/1 14:00 TO 16:00 | HOUSEKEEPER |
| 5 | USER E | 512 | ROOM 512 | AUTHORIZED USER | 2021/2/2 10:00 TO 17:00 | BABYSITTER |
| 5 | USER E | 599 | KIDS' ROOM | AUTHORIZED USER | 2021/2/2 10:00 TO 17:00 | BABYSITTER |
| 6 | USER F | – | – | UNAUTHORIZED USER | | DELIVERY COMPANY |

2121　2122　2123

ENTRY CONTROL DEVICE, ENTRY CONTROL SYSTEM, ENTRY CONTROL METHOD, AND NON-TRANSITORY COMPUTER-READABLE MEDIUM

This application is a National Stage Entry of PCT/JP2021/009744 filed on Mar. 11, 2021, the contents of all of which are incorporated herein by reference, in their entirety.

TECHNICAL FIELD

The present disclosure relates to an entry control device, an entry control system, an entry control method, and a non-transitory computer-readable medium.

BACKGROUND ART

A technique for performing personal authentication of a user by using biometric authentication has been known. As a related art, for example, Patent Literature 1 discloses an electronic input system in which only an authenticated person can perform an operation for an input and perform an input.

The system includes an iris reading unit that reads iris information about a user, a display unit that displays an information input screen, an information input unit to which information is input from the user by using the information input screen, and an input control unit that transmits the input information and the read iris information to an electronic input management device. Further, the system further includes a user information storage unit in which iris information about a predetermined user is registered, an iris authentication unit that performs iris authentication and judges a result by an authentication result, and a communication control unit that outputs the input information to an external output unit when the iris authentication result is passed. The iris authentication unit performs the iris authentication by using the iris information being registered in the user information storage unit and the iris information being read by the iris reading unit. The display unit displays the information input screen when the iris authentication result is passed.

With such a configuration, the system disclosed in Patent Literature 1 displays, for example, an input screen for voting in an election for only a user who succeeds in personal authentication, and receives an input of the user. The input screen is not displayed for a user who fails in the personal authentication, and thus fraudulent voting can be prevented from being performed by another user.

Further, as a different related art, Patent Literature 2 discloses an authentication system that sets a plurality of authentication steps and performs authentication. The authentication system includes an authentication device in a first step, an authentication device in a second step, and an authentication device in a third step. The authentication device in the first step verifies first biometric information acquired from a user with first registration information, performs authentication, and transmits the first biometric information subjected to the authentication to the authentication device in the second step. The authentication device in the second step verifies second biometric information acquired from the user with second registration information and the first biometric information, performs authentication, and transmits the first biometric information and/or the second biometric information subjected to the authentication to the authentication device in the third step. The authentication device in the third step verifies third biometric information acquired from the user with third registration information, and the first biometric information and/or the second biometric information, and performs authentication.

With such a configuration, the system disclosed in Patent Literature 2 can use, in a multiplex manner, biometric information acquired within a certain period with a small variation in an authentication range together with biometric information being registered in each of the biometric authentication devices in the multiple steps. Therefore, another person can be prevented from being accepted, and security can be strengthened. Further, the system performs authentication by using biometric information being authenticated until a previous step and biometric information being acquired within a certain period, and thus rejection of acceptance of a person can be prevented, authentication accuracy can be improved, and troublesomeness of user authentication can be prevented.

CITATION LIST

Patent Literature

[PTL 1] Japanese Unexamined Patent Application Publication No. 2012-073963
[PTL 2] Japanese Unexamined Patent Application Publication No. 2010-092122

SUMMARY OF INVENTION

Technical Problem

For example, a case where entry to an entrance or a residence is permitted by using biometric authentication in an apartment house such as a condominium is assumed. A resident of a condominium can use the biometric authentication in the condominium by registering biometric information such as his/her face image and iris image in advance in a predetermined server when the resident moves in, and the like. For example, the resident can perform face authentication in front of an entrance, and can enter the inside of the condominium when the face authentication succeeds. Further, at a time of entry to a residential area, his/her residence, and the like, the resident performs the authentication by the face authentication and iris authentication, and, when both pieces of the authentication succeed, the resident can enter the regions. In this way, for entry to a residence and the like that require a higher security level than that of entry to an entrance, personal authentication can be more strictly performed.

In such a condominium, a resident of the condominium may use a service such as a housekeeper and a babysitter. A housekeeper and the like enter the condominium, and perform business such as a housework service in a residence of a contractor. When a resident is at home, an entrance or a door of a residence can be unlocked through an intercom and the like, but such a service is often desired to be performed while the resident is not at home.

When the resident is not at home, entry management to the condominium can also be performed for a housekeeper similarly to the resident by registering biometric information about the housekeeper in advance in a server. However, in that case, a person other than the resident can freely enter and exit from the condominium, and thus there is concern about security.

An object of the present disclosure is, in view of the problem described above, to provide an entry control device, an entry control system, an entry control method, and a non-transitory computer-readable medium that are able to appropriately perform entry management of a user who is permitted to enter a predetermined region.

Solution to Problem

An entry control device according to the present disclosure includes:
a first biometric authentication control means for acquiring first biometric information from a predetermined user who tries to enter a facility including a plurality of regions where entry is restricted in each of a plurality of locking systems, and controlling first biometric authentication;
an attribute information acquisition means for acquiring attribute information about the user when the first biometric authentication has succeeded;
a registration means for registering, in association with a patron of a facility in a storage device, second biometric information acquired from the user when an attribute of the user is an authorized user who is permitted in advance by the patron to enter a predetermined region of the facility;
a second biometric authentication control means for acquiring biometric information including the second biometric information from the user when the user enters the predetermined region permitted in advance to be entered, and controlling second biometric authentication using the acquired biometric information; and
an unlocking control means for instructing unlocking to the locking system installed at an entrance of the predetermined region when the second biometric authentication has succeeded.

An entry control system according to the present disclosure includes:
a plurality of locking systems installed at an entrance of each of a plurality of regions and configured to restrict entry; and
an entry control device, wherein
the entry control device includes
a first biometric authentication control means for acquiring first biometric information from a predetermined user who tries to enter a facility including a plurality of regions where entry is restricted in each of a plurality of locking systems, and controlling first biometric authentication,
an attribute information acquisition means for acquiring attribute information about the user when the first biometric authentication has succeeded,
a registration means for registering, in association with a patron of a facility in a storage device, second biometric information acquired from the user when an attribute of the user is an authorized user who is permitted in advance by the patron to enter a predetermined region of the facility,
a second biometric authentication control means for acquiring biometric information including the second biometric information from the user when the user enters the predetermined region permitted in advance to be entered, and controlling second biometric authentication using the acquired biometric information, and
an unlocking control means for instructing unlocking to the locking system installed at an entrance of the predetermined region when the second biometric authentication has succeeded.

An entry control method according to the present disclosure includes, by a computer:
acquiring first biometric information from a predetermined user who tries to enter a facility including a plurality of regions where entry is restricted in each of a plurality of locking systems, and controlling first biometric authentication;
acquiring attribute information about the user when the first biometric authentication has succeeded;
registering, in association with a patron of a facility in a storage device, second biometric information acquired from the user when an attribute of the user is an authorized user who is permitted in advance by the patron to enter a predetermined region of the facility;
acquiring biometric information including the second biometric information from the user when the user enters the predetermined region permitted in advance to be entered, and controlling second biometric authentication using the acquired biometric information; and
instructing unlocking to the locking system installed at an entrance of the predetermined region when the second biometric authentication has succeeded.

A non-transitory computer-readable medium storing an entry control program according to the present disclosure causes a computer to execute:
first biometric authentication control processing of acquiring first biometric information from a predetermined user who tries to enter a facility including a plurality of regions where entry is restricted in each of a plurality of locking systems, and controlling first biometric authentication;
attribute information acquisition processing of acquiring attribute information about the user when the first biometric authentication has succeeded;
registration processing of registering, in association with a patron of a facility in a storage device, second biometric information acquired from the user when an attribute of the user is an authorized user who is permitted in advance by the patron to enter a predetermined region of the facility;
second biometric authentication control processing of acquiring biometric information including the second biometric information from the user when the user enters the predetermined region permitted in advance to be entered, and controlling second biometric authentication using the acquired biometric information; and
unlocking control processing of instructing unlocking to the locking system installed at an entrance of the predetermined region when the second biometric authentication has succeeded.

Advantageous Effects of Invention

An entry control device, an entry control system, an entry control method, and a non-transitory computer-readable medium according to the present disclosure are able to appropriately perform entry management of a user who is permitted to enter a predetermined region.

BRIEF DESCRIPTION OF DRAWINGS

FIG. 10 is a diagram illustrating region identification information according to the second example embodiment;

EXAMPLE EMBODIMENT

First Example Embodiment

Figure 1:
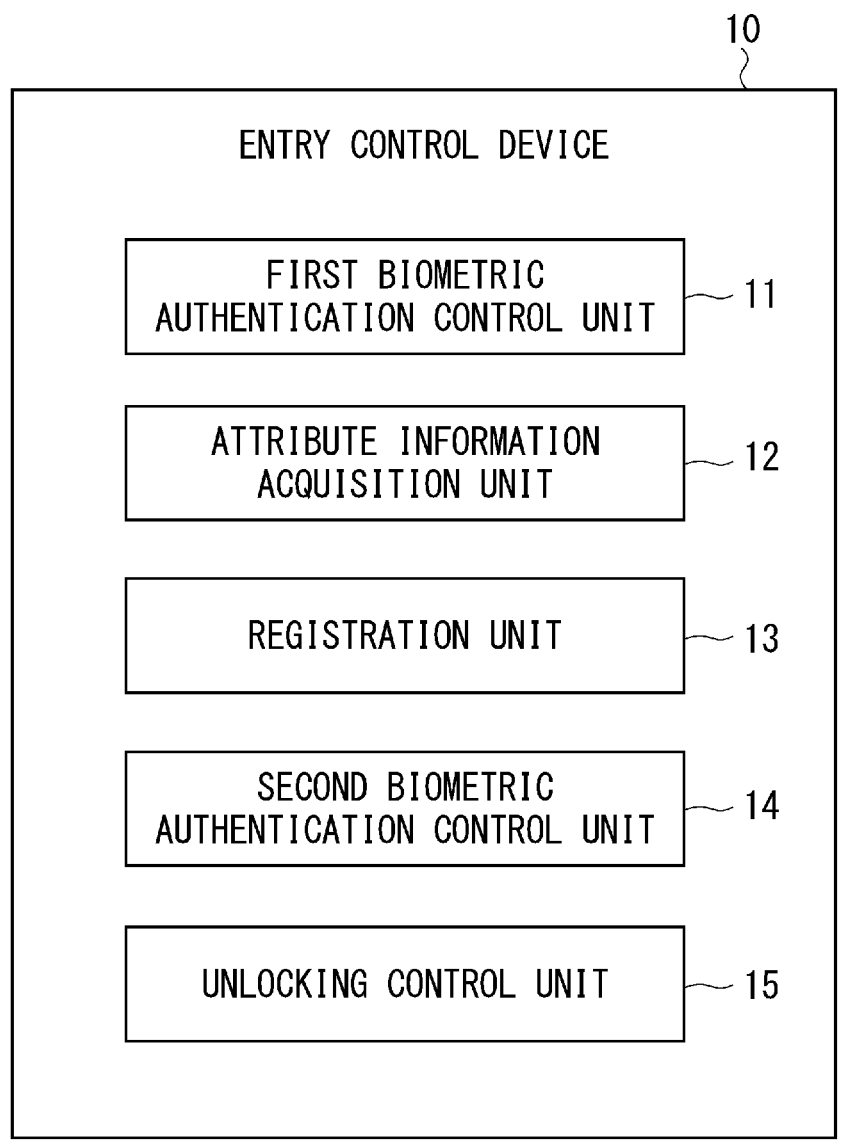
FIG. 1 is a block diagram illustrating a configuration of an entry control device according to a first example embodiment.

Example embodiments of the present disclosure will be described below with reference to the drawings. FIG. 1 is a block diagram illustrating a configuration of an entry control device 10 according to the present example embodiment. The entry control device 10 includes a first biometric authentication control unit 11, an attribute information acquisition unit 12, a registration unit 13, a second biometric authentication control unit 14, and an unlocking control unit 15.

The first biometric authentication control unit 11 acquires first biometric information from a predetermined user who tries to enter a facility including a plurality of regions where entry is restricted in each of a plurality of locking systems, and controls first biometric authentication.

The attribute information acquisition unit 12 acquires attribute information about the user when the user has succeeded in the first biometric authentication.

The registration unit 13 registers, in association with a patron of a facility in a storage device, second biometric information acquired from the user when an attribute of the user acquired in the attribute information acquisition unit 12 is an authorized user who is permitted in advance by the patron to enter a predetermined region of the facility.

The second biometric authentication control unit 14 acquires biometric information including the second biometric information from the user when the user enters the predetermined region permitted in advance to be entered, and controls second biometric authentication using the acquired biometric information.

The unlocking control unit 15 instructs unlocking to the locking system installed at an entrance of the predetermined region when the user has succeeded in the second biometric authentication.

Figure 2:
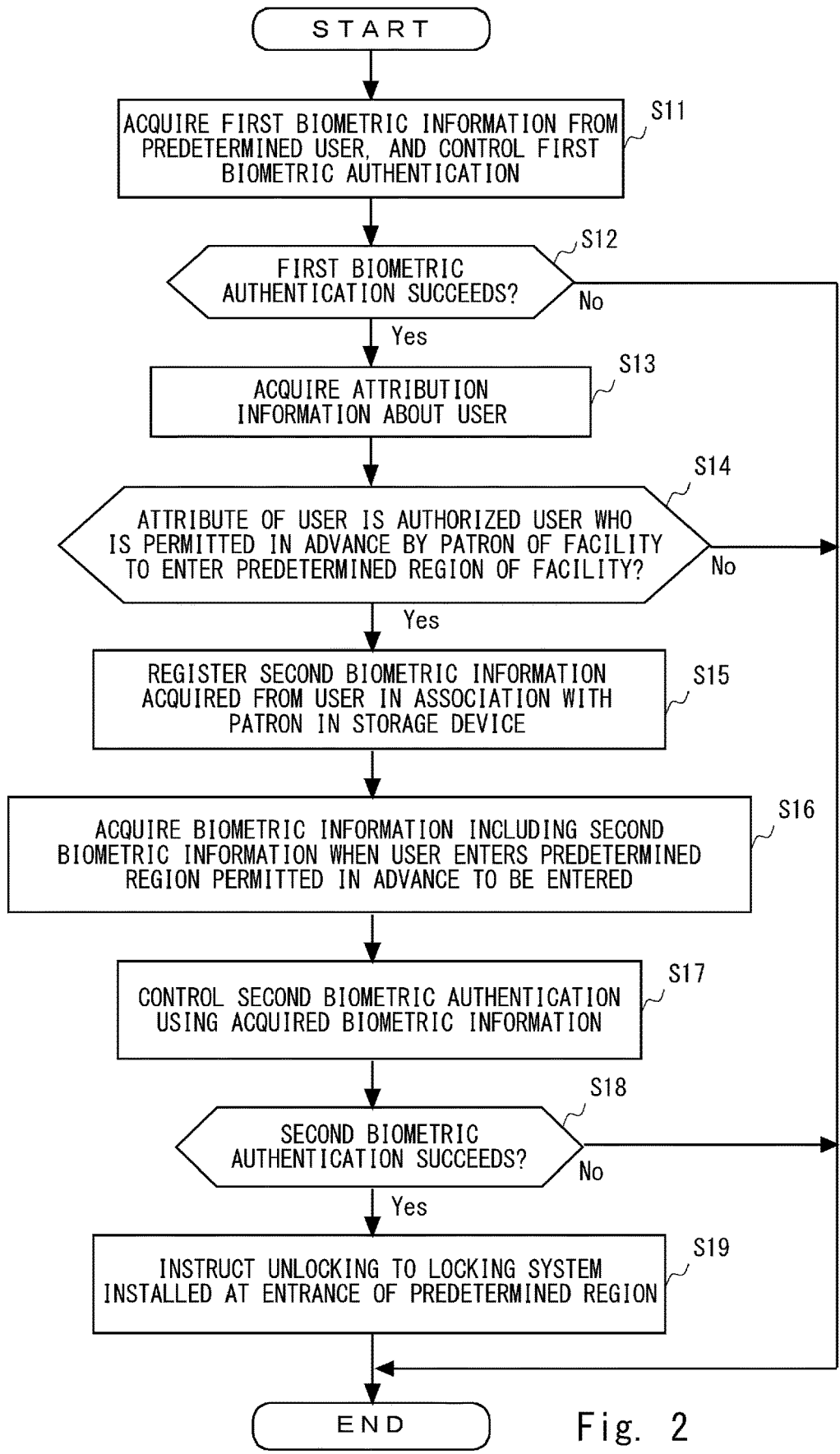
FIG. 2 is a flowchart illustrating processing of the entry control device according to the first example embodiment.

FIG. 2 is a flowchart illustrating processing of the entry control device 10. The first biometric authentication control unit 11 acquires first biometric information from a predetermined user, and controls first biometric authentication (S11). The attribute information acquisition unit 12 judges whether the user has succeeded in the first biometric authentication (S12). When the user has succeeded in the first biometric authentication (Yes in S12), the attribute information acquisition unit 12 acquires attribute information about the user (S13).

The registration unit 13 judges whether an attribute of the user acquired in the processing in S13 is an authorized user who is permitted in advance by a patron of a facility to enter a predetermined region of the facility (S14). When the attribute of the user is the authorized user (Yes in S14), the registration unit 13 registers second biometric information acquired from the user in association with the patron in a storage device (S15).

The second biometric authentication control unit 14 acquires biometric information including the second biometric information from the user when the user enters the predetermined region permitted in advance to be entered (S16). The second biometric authentication control unit 14 controls second biometric authentication using the acquired biometric information (S17).

The unlocking control unit 15 judges whether the user has succeeded in the second biometric authentication (S18). When the user has succeeded in the second biometric authentication (Yes in S18), the unlocking control unit 15 instructs unlocking to a locking system installed at an entrance of the predetermined region (S19).

When the user has failed in the first biometric authentication (No in S12), when the attribute of the user is not the authorized user (No in S14), or when the user has failed in the second biometric authentication (No in S18), the processing ends.

In this way, in the entry control device 10 according to the present example embodiment, the first biometric authentication control unit 11 acquires first biometric information about a user, and controls first biometric authentication by using the acquired first biometric information. When the user has succeeded in the first biometric authentication, the attribute information acquisition unit 12 acquires attribute information about the user. When the acquired attribute information is an authorized user, the registration unit 13 registers second biometric information acquired from the user in association with a patron in a storage device. The second biometric authentication control unit 14 acquires biometric information including the second biometric information, and controls second biometric authentication by using the acquired biometric information. When the user has succeeded in the second biometric authentication, the unlocking control unit 15 instructs unlocking to a locking system installed at an entrance of a predetermined region.

In this way, the entry control device 10 can confirm that the user who succeeds in the first biometric authentication is the authorized user who is permitted in advance to enter the predetermined region, then perform the second biometric authentication on the user, and permit entry to the region in response to the success of the second biometric authentication. Therefore, the entry control device 10 according to the present example embodiment can appropriately perform entry management of the user who is permitted to enter the predetermined region.

Note that the entry control device 10 includes a processor, a memory, and a storage device as a configuration that is not illustrated. Further, the storage device stores a computer program in which processing of an entry control method according to the present example embodiment is implemented. Then, the processor reads the computer program from the storage device into the memory, and executes the computer program. In this way, the processor achieves the function of the first biometric authentication control unit 11, the attribute information acquisition unit 12, the registration unit 13, the second biometric authentication control unit 14, and the unlocking control unit 15.

Alternatively, the first biometric authentication control unit 11, the attribute information acquisition unit 12, the registration unit 13, the second biometric authentication control unit 14, and the unlocking control unit 15 may each be achieved by dedicated hardware. Further, a part or the whole of each of the components of each of the devices may be achieved by general-purpose or dedicated circuitry, processor, and the like, or achieved by a combination thereof. A part or the whole of each of the components may be formed by a single chip or formed by a plurality of chips connected to one another via a bus. A part or the whole of each of the components of each of the devices may be achieved by a combination of the above-described circuitry and the like and a program. Further, as the processor, a central processing unit (CPU), a graphics processing unit (GPU), a field-programmable gate array (FPGA), a quantum processor (quantum computer control chip), or the like can be used.

Further, when a part of the whole of each of the components of the entry control device 10 is achieved by a plurality of information processing devices, circuitry, or the like, the plurality of information processing devices, the circuitry, or the like may be arranged in a centralized manner or a distributed manner. For example, the information processing devices, the circuitry, and the like may be achieved as a form in which those are connected with each other via a client server system, a cloud computing system, or the like. Further, the function of the entry control device 10 may be provided in a SaaS (Software as a Service) form.

Second Example Embodiment

Figure 3:
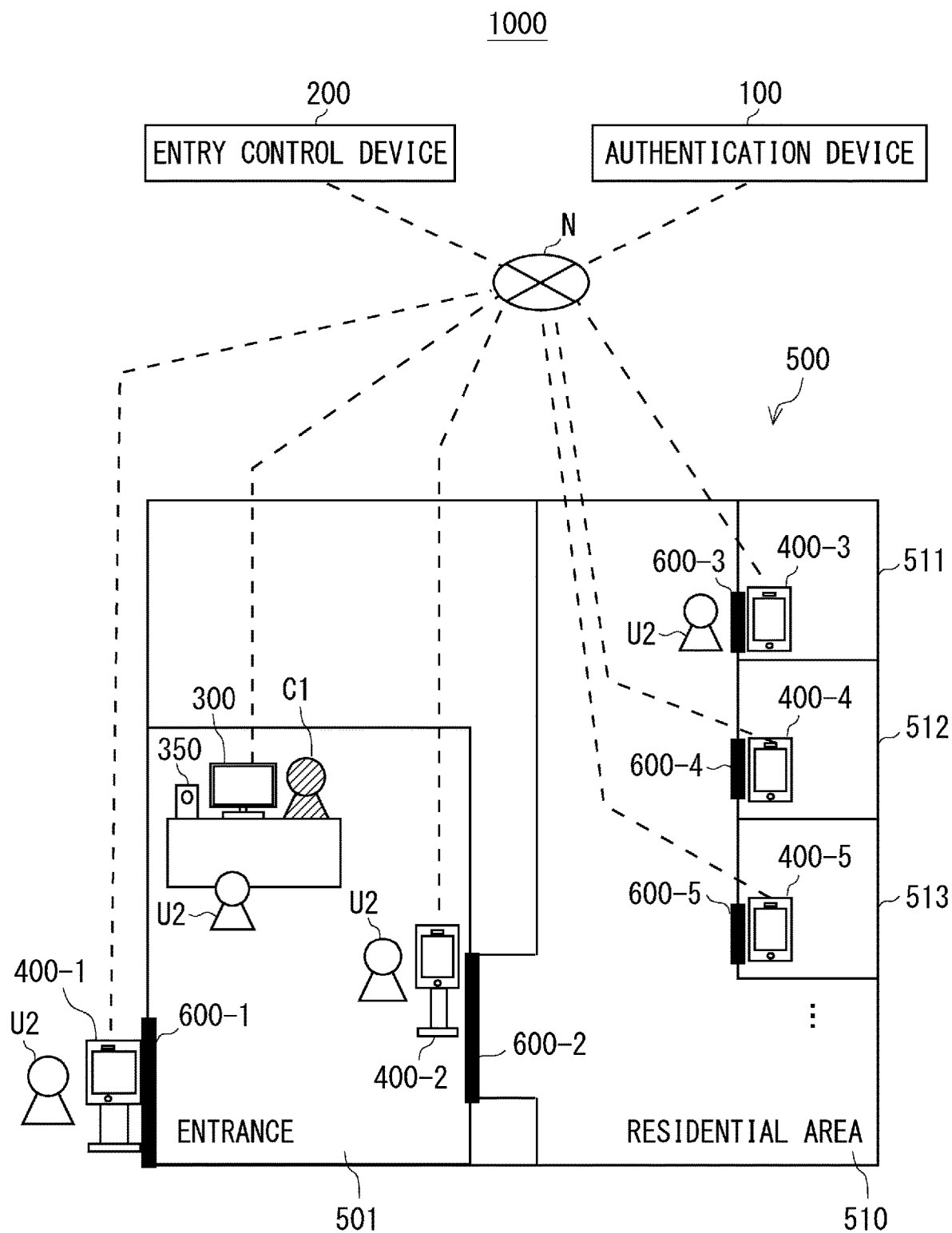
FIG. 3 is a block diagram illustrating a configuration of an entry control system according to a second example embodiment.

A second example embodiment is a specific example of the first example embodiment described above. FIG. 3 is a block diagram illustrating a configuration of an entry control system 1000 according to the present example embodiment. The entry control system 1000 can be applied to a facility including a plurality of regions where entry is restricted in each of a plurality of locking systems. Herein, description is given on an assumption that the facility is an apartment house 500 such as a condominium or an apartment. The entry control system 1000 is an information system for controlling entry to each region present in the apartment house 500. The entry control system 1000 is not limited to an apartment house, and may be applied to an office and the like.

The apartment house 500 includes an entrance 501 and a residential area 510, and a residence 511, a residence 512, and a residence 513 are present in the residential area 510. Hereinafter, the entrance 501, the residential area 510, and each of the residences 511 to 513 are referred to as a "region". The present disclosure is not limited to this, and the region may include a common facility. The common facility is not limited to, for example, a fitness studio and a theater room usable by a resident, and may include a kids' room, a study room, and the like being used for service provision by a babysitter, a home tutor, and the like.

The entry control system 1000 includes authentication terminals 400-1 to 400-5, gate devices 600-1 to 600-5, a caretaker terminal 300, an image-capturing device 350, an entry control device 200, and an authentication device 100. The authentication terminals 400-1 to 400-5, the caretaker terminal 300, the entry control device 200, and the authentication device 100 are connected to one another via a network N. The network N is a wired or wireless communication line.

The authentication terminals 400-1 to 400-5 and the associated gate devices 600-1 to 600-5 are installed at an entrance of each region. For example, the authentication terminal 400-1 and the gate device 600-1 are installed at an entrance of the entrance 501. Then, the authentication terminal 400-1 and the gate device 600-1 are connected to each other.

Note that, in the following description, at a time of entry to each region, personal authentication of a user is assumed to be performed by using either or both of face authentication and iris authentication. Further, biometric information acquired from a user is assumed to be face feature information and iris feature information. The present disclosure is not limited to this, and another technique using a captured image can be applied to biometric authentication and biometric information. For example, the biometric information may use data (feature value) calculated from a physical feature unique to an individual such as a fingerprint, a voiceprint, a vein, and a retina.

Note that, in the following description, the authentication terminals 400-1 to 400-5 may be simply referred to as an authentication terminal 400. Further, the gate devices 600-1 to 600-5 may be simply referred to as a gate device 600. Further, each of the authentication terminals 400-1 to 400-5 is one example of a locking system. Further, the gate device 600 is, for example, a security gate, an automatic door, and a normal door, but may be assumed to open a lock in response to an unlocking instruction from the connected authentication terminal 400.

A resident U1 of the apartment house 500 registers his/her personal information (such as a name, gender, a room number, and contact information) in advance in the entry control device 200, and also registers his/her face image and iris image in the authentication device 100. The pieces of information can be managed as identification information that identifies the resident U1, and can be mutually referred between the authentication device 100 and the entry control device 200. The resident U1 may register the personal information, the face image, and the iris image from the caretaker terminal 300, or by using a communication terminal and the like possessed by the resident U1. In this way, the face image and the iris image are registered in advance in the authentication device 100, and thus the resident U1 can enter each region by using the face authentication and the iris authentication in the apartment house 500.

In FIG. 3, a visitor U2 is a person who visits the apartment house 500. The visitor U2 may be a person who stays for a predetermined period of time in a predetermined region in the apartment house 500 and provides a predetermined service. The visitor U2 may include, for example, a housekeeper, a housework helper, a babysitter, a home tutor, or the like.

Hereinafter, description is given on an assumption that the visitor U2 is a housekeeper who is under a contract with a resident of the residence 511. Further, hereinafter, each of the resident U1 and the visitor U2 may be simply referred to as a user.

Herein, a flow of processing when the resident U1 and the visitor U2 make a business outsourcing contract will be described. The resident U1 requests business from the visitor U2 through a special application (hereinafter, referred to as a special app), a web site, and the like for registering a housekeeper, performs a predetermined procedure, and makes a contract with the visitor U2. A contract content includes, for example, a content such as a date and time, a content, and a charge of a service by the visitor U2. Hereinafter, description is given on an assumption that the resident U1 and the visitor U2 make a contract on the special app. Further, the entry control device 200 can acquire information included in the contract content described above via the special app, and store the information in a storage unit 210.

First, the resident U1 requests business from the visitor U2 through the special app. The special app notifies the visitor U2 of a necessary matter related to service provision. The necessary matter includes, for example, a name of the resident U1, a place of the apartment house 500 where service provision is performed, a room number, a date and time of the service provision, a service provision content, a charge, and the like. The visitor U2 confirms a notification content and accepts the request from the resident U1, and a contract between the resident U1 and the visitor U2 is made. When the contract is made, the entry control device 200 acquires a contract content including the necessary matter described above from the special app, and stores the contract content in the storage unit 210. The entry control device 200 may notify, via the special app, the resident U1 and the visitor U2 of a fact that the contract is made and the contract content. Further, the entry control device 200 may receive an input from the resident U1 and the visitor U2, and perform a change and the like of the contract content.

The resident U1 prompts the visitor U2 to register a face image in the authentication device 100. For example, the resident U1 notifies the visitor U2 of a URL of a registration web page via the special app, and requests the visitor U2 to register a face image. The registration request may be automatically performed from the special app.

The visitor U2 registers his/her face image in the authentication device 100 until a date and time of service provision. The special app may notify the resident U1 of completion of the registration of the face image and the face image of the visitor U2, and allow the resident U1 to confirm a registration content.

Note that, when a face image of the visitor U2 is put on the special app, the resident U1 may register the face image as an authentication image in the authentication device 100. Further, the special app may automatically perform the registration processing.

Herein, similarly to the resident U1, when the visitor U2 can also register a face image and an iris image in advance in the authentication device 100, the visitor U2 can use the face authentication and the iris authentication in the apartment house 500. However, a camera that is a sensor identifying an iris and can detect an infrared region is generally expensive, and it may be difficult to register an iris image from a communication terminal and the like possessed by the visitor U2. Thus, it is assumed in the present example embodiment that the visitor U2 registers only a face image in advance in the authentication device 100, and performs registration by using the image-capturing device 350 and the caretaker terminal 300 when the visitor U2 visits the apartment house 500.

Figure 4:
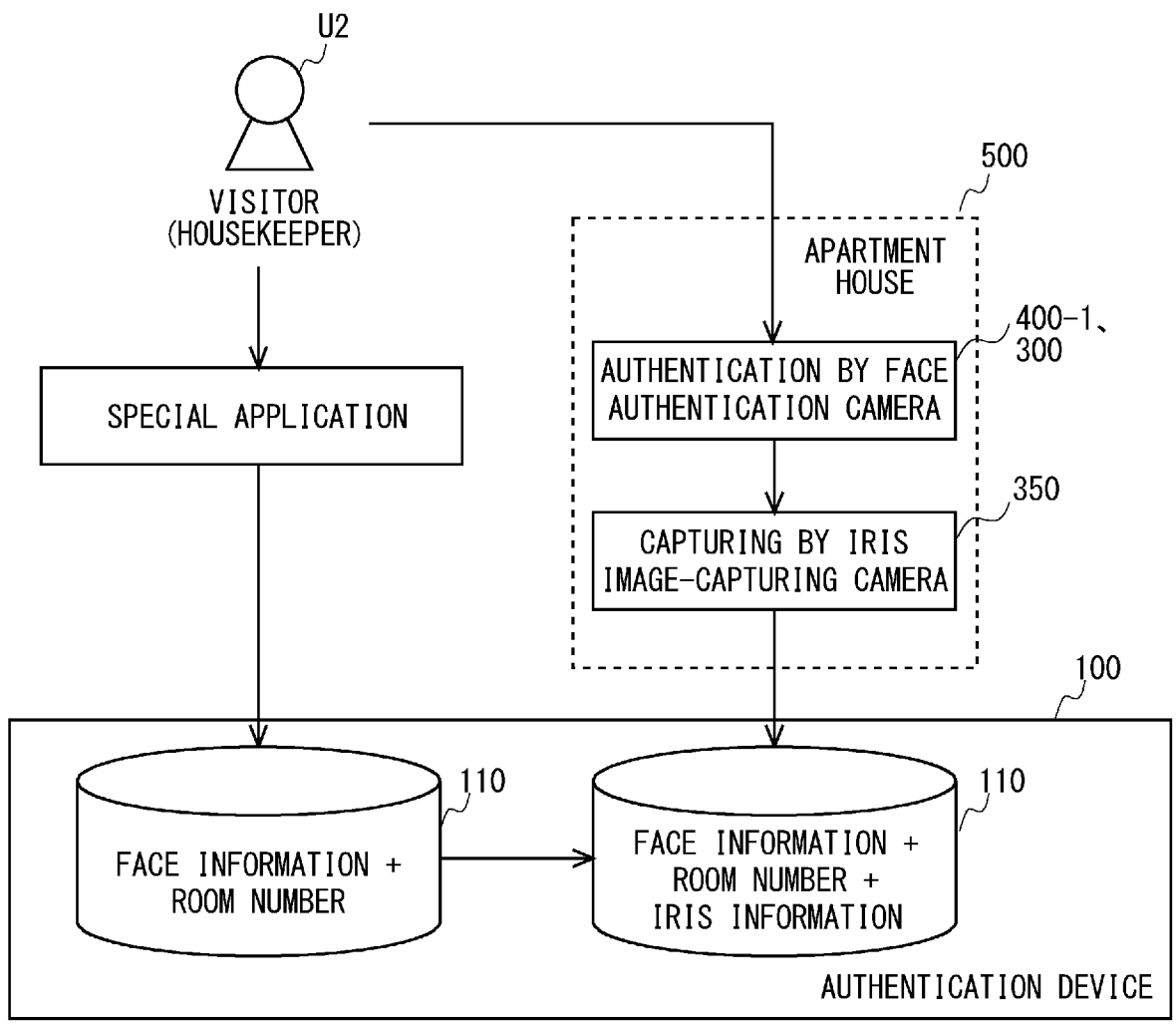
FIG. 4 is a diagram illustrating an overview of a flow of registration of an iris image of a visitor according to the second example embodiment.

FIG. 4 is a diagram illustrating an overview of a flow of registration of an iris image of the visitor U2 according to the present example embodiment. Note that a unidirectional arrow clearly indicates a flow of information (data, a signal, or the like), and does not eliminate a bidirectional property of information.

As described above, the visitor U2 registers his/her face image in the authentication device 100 via the special app. The authentication device 100 stores face information about the visitor U2 and a room number of a room where the visitor U2 performs business in association with each other in a biometric information database (DB) 110. For the room number, the room number of the resident U1 may be automatically acquired via the special app. Further, the visitor U2 may further register, in the authentication device 100, a date and time of service provision in the apartment house 500 and a visiting purpose to the apartment house 500 in association with the face image and the room number. The date and time of the service provision and the visiting purpose may be automatically acquired from a contract content between the resident U1 and the visitor U2 via the special app. Further, the pieces of information may be acquired by being input by the visitor U2 from the special app. The authentication device 100 stores the face information about the visitor U2, the room number, the date and time of the service provision, and the visiting purpose in association with one another in the biometric information DB 110.

The visitor U2 visits the apartment house 500 on the date and time of the service provision. In the apartment house 500, face authentication of the visitor U2 is performed in the authentication terminal 400-1 installed in front of the entrance 501. When the face authentication succeeds, the visitor U2 can enter the inside of the entrance 501. Note that the authentication terminal 400-1 may more strictly perform authentication of the visitor U2 by using the room number, the date and time of the service provision, the visiting purpose, or the like in addition to the face authentication.

The visitor U2 captures an iris by using the image-capturing device 350 with a caretaker (concierge) C1 present. The caretaker C1 transmits an iris image of the visitor U2 to the authentication device 100 by using the caretaker terminal 300. The authentication device 100 performs predetermined registration processing, and registers iris information about the visitor U2. The authentication device 100 stores, in the biometric information DB 110, the iris information about the visitor U2 in association with the face information about the visitor U2, the room number, the date and time of the service provision, and the visiting purpose that are registered in advance. In this way, the visitor U2 can use both of the face authentication and the iris authentication in the apartment house 500.

Note that it is assumed for the description herein that all of the face information, the room number, the date and time of the service provision, the visiting purpose, and the iris information are stored in the authentication device 100, but, as in the present example embodiment, it may be assumed that the face information and the iris information are stored in the authentication device 100 and the room number, the date and time of the service provision, and the visiting purpose are stored in the entry control device 200.

Further, it is assumed herein that the visitor U2 has already registered the face image in advance and registers only the iris image from the caretaker terminal 300, which is not limited thereto. The visitor U2 may register both of the face image and the iris image by using the caretaker terminal 300. In that case, the visitor U2 performs personal authentication by using a different authentication method by the authentication terminal 400-1, or calls the caretaker C1 and enters the entrance 501.

Figure 5:
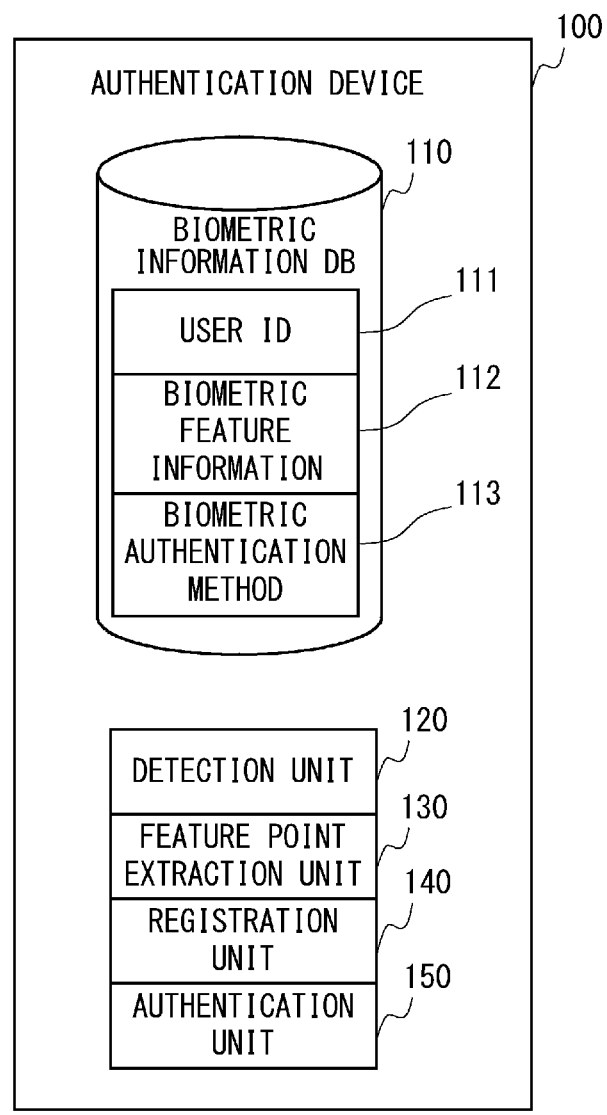
FIG. 5 is a block diagram illustrating a configuration of an authentication device according to the second example embodiment.

Next, a configuration of the authentication device 100 will be described. FIG. 5 is a block diagram illustrating the configuration of the authentication device 100 according to the second example embodiment. The authentication device 100 includes the biometric information DB 110, a detection unit 120, a feature point extraction unit 130, a registration unit 140, and an authentication unit 150.

The biometric information DB 110 stores a user ID 111, biometric feature information 112 of the user ID, and a biometric authentication method 113 in association with one another. The biometric feature information 112 is a set of feature points extracted from a face image and an iris image. The biometric authentication method 113 is an authentication method such as face authentication, iris authentication, and vein authentication. Herein, description is given by using the face authentication and the iris authentication. Note that the authentication device 100 may delete the biometric feature information 112 in the biometric information DB 110 in response to a request from a registered user of the biometric feature information 112. Alternatively, the authentication device 100 may delete the biometric feature information 112 from registration after a certain period has elapsed.

The detection unit 120 detects an area of a face and an iris included in a registration image for registering biometric information, and outputs the area to the feature point extraction unit 130. The feature point extraction unit 130 extracts a feature point from the face area and the like detected by the detection unit 120, and outputs biometric feature information to the registration unit 140. Further, the feature point extraction unit 130 extracts a feature point included in a face image and the like received from the entry control device 200, and outputs biometric feature information to the authentication unit 150. Note that the detection unit 120 may detect a plurality of areas from one registration image. In that case, the feature point extraction unit 130 may extract a feature point from each of the plurality of extracted areas. For example, the detection unit 120 detects a face area and an iris area included in a face image. The feature point extraction unit 130 may extract a feature point from each of the face area and the iris area detected by the detection unit 120, and output face feature information and iris feature information to the registration unit 140.

The registration unit 140 newly issues the user ID 111 at a time of registration of the biometric feature information. Further, the registration unit 140 determines the biometric authentication method 113 according to an area detected by the detection unit 120. For example, when the detection unit 120 detects a face area, the registration unit 140 determines the biometric authentication method 113 as the face authentication, and, when the detection unit 120 detects an iris area, the registration unit 140 determines the biometric authentication method 113 as the iris authentication. The registration unit 140 registers, in the biometric information DB 110, the issued user ID 111, the biometric feature information 112 extracted from the registration image, and the determined biometric authentication method 113 in association with one another. The authentication unit 150 performs biometric authentication using the biometric feature information 112. Specifically, the authentication unit 150 determines the biometric authentication method according to the extracted biometric feature information. The authentication unit 150 verifies the biometric feature information extracted from the face image and the like with the biometric feature information 112 in the biometric information DB 110 associated with the determined biometric authentication method 113. The authentication unit 150 returns presence or absence of coincidence of the biometric feature information to the entry control device 200. Presence or absence of coincidence of the biometric feature information is associated with whether the authentication succeeds or fails. Note that the coincidence (presence of coincidence) of the biometric feature information refers to a case where a degree of coincidence is equal to or more than a predetermined value.

Figure 6:
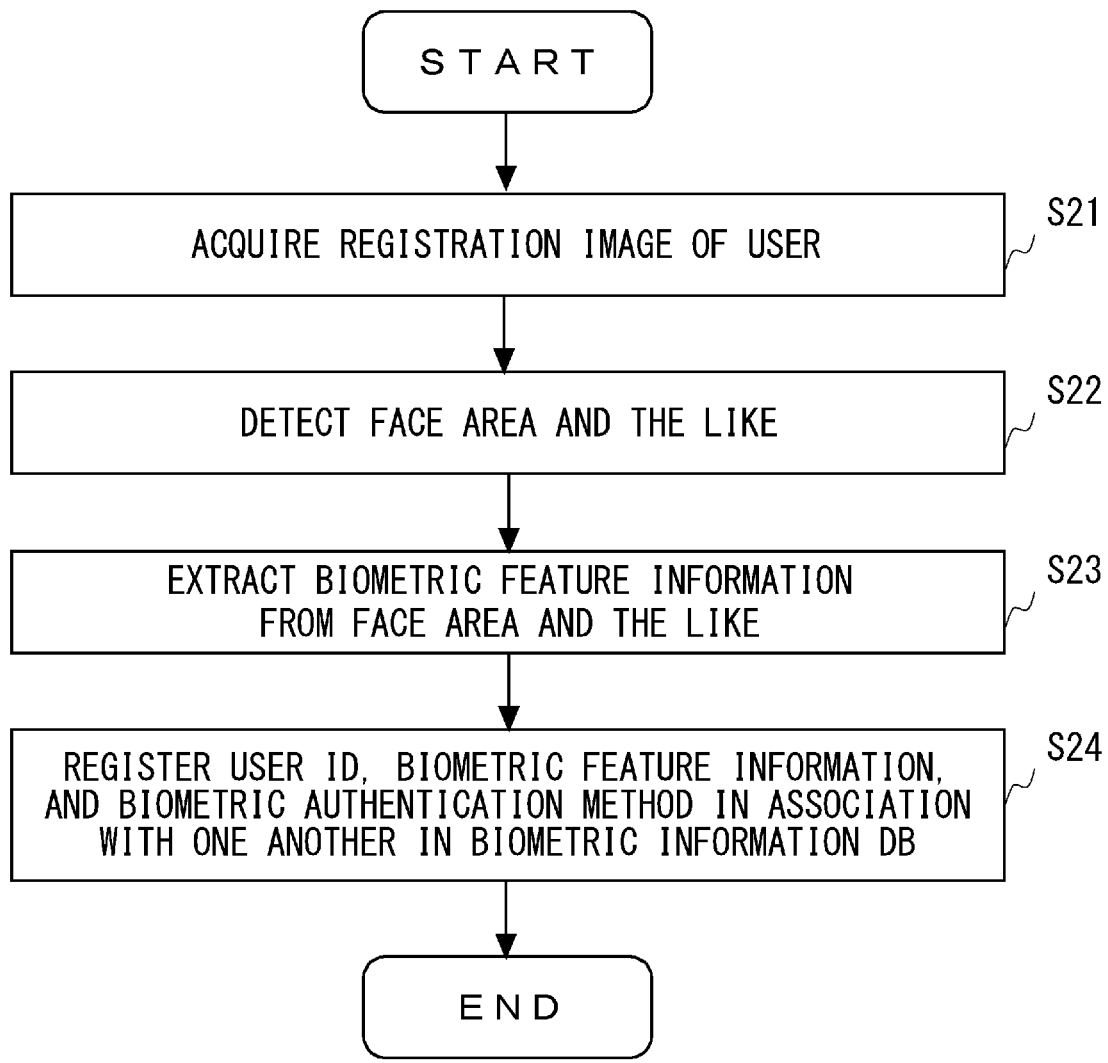
FIG. 6 is a flowchart illustrating a flow of biometric information registration processing according to the second example embodiment.

Next, registration processing and authentication processing of biometric information according to the present second example embodiment will be described. FIG. 6 is a flowchart illustrating a flow of biometric information registration processing according to the present second example embodiment. First, the authentication device 100 acquires a registration image included in a biometric information registration request (S21). For example, the authentication device 100 receives the biometric information registration request from the authentication terminal 400, the caretaker terminal 300, a registration web site, or the like via the network N.

Next, the detection unit 120 detects a face area and the like of a user included in the registration image (S22). Next, the feature point extraction unit 130 extracts a feature point from the face area and the like detected in step S22, and outputs biometric feature information to the registration unit 140 (S23). Lastly, the registration unit 140 issues the user ID 111, and registers the user ID 111, the biometric feature information 112, and the biometric authentication method 113 in association with one another in the biometric information DB 110 (S24). The authentication device 100 may receive the biometric feature information 112 from a terminal and the like possessed by the user, and register the biometric feature information 112 in association with the user ID 111 and the biometric authentication method 113 in the biometric information DB 110.

Figure 7:
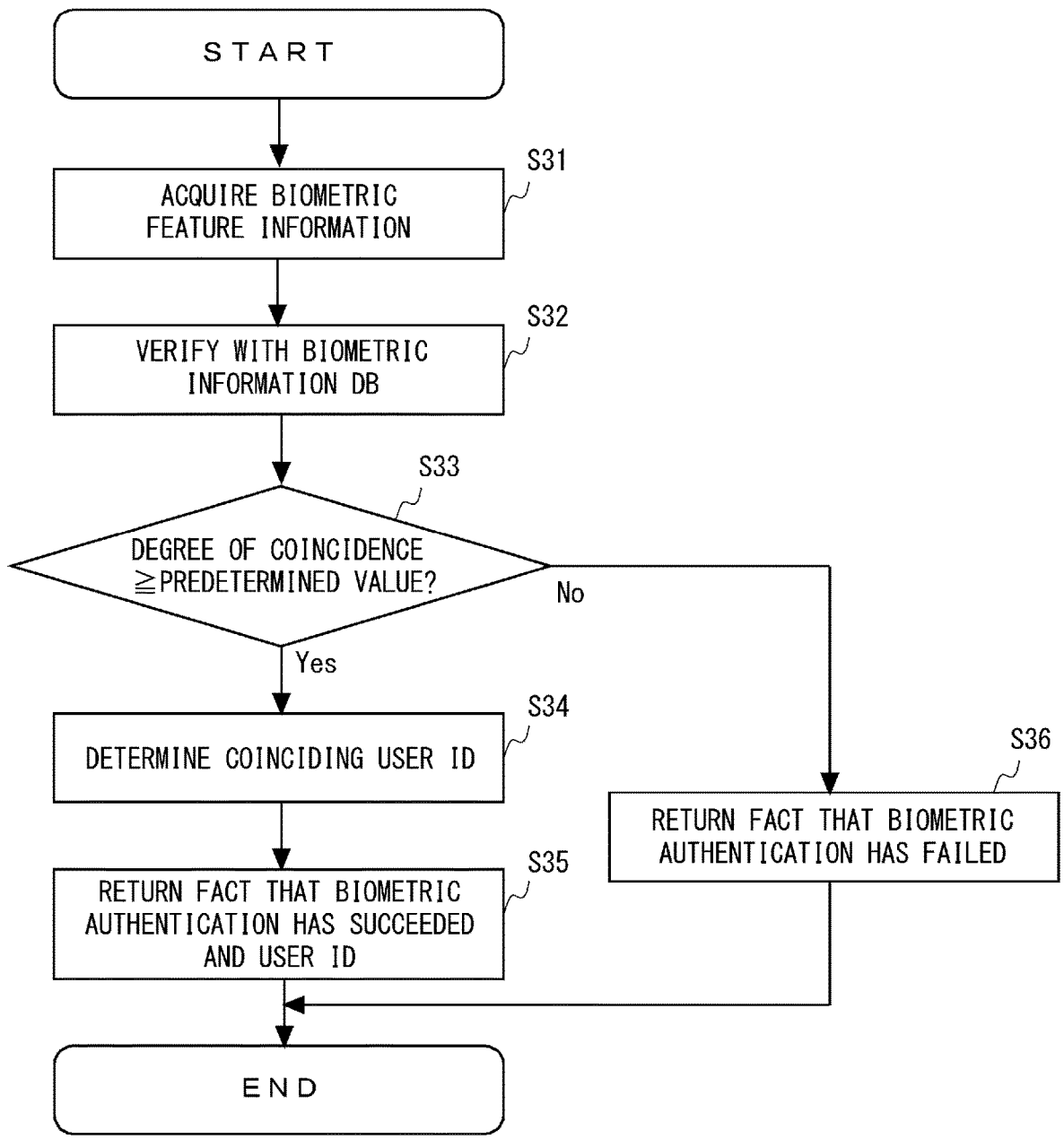
FIG. 7 is a flowchart illustrating a flow of biometric authentication processing according to the second example embodiment.

FIG. 7 is a flowchart illustrating a flow of biometric authentication processing by the authentication device 100 according to the present second example embodiment. First, the feature point extraction unit 130 acquires an authentication face image and the like included in a biometric authentication request (S31). For example, the authentication device 100 receives the biometric authentication request from the entry control device 200 via the network N, and extracts biometric feature information from a biometric image included in the biometric authentication request as in steps S21 to S23. Alternatively, the authentication device 100 may receive the biometric feature information from the entry control device 200.

Next, the authentication unit 150 verifies the acquired biometric feature information with the biometric feature information 112 in the biometric information DB 110 (S32). When the pieces of biometric feature information coincide with each other, that is, when a degree of coincidence of the biometric feature information is equal to or more than a predetermined value (Yes in S33), the authentication unit 150 determines the user ID 111 of a user whose biometric feature information coincides (S34). Then, the authentication unit 150 returns a fact that biometric authentication has succeeded and the determined user ID 111 to the entry control device 200 (S35). When there is no coinciding biometric feature information (No in S33), the authentication unit 150 returns a fact that the biometric authentication has failed to the entry control device 200 (S36).

Note that, in step S32, the authentication unit 150 does not need to attempt verification with all pieces of the biometric feature information 112 in the biometric information DB 110. For example, the authentication unit 150 can receive a biometric authentication request including the biometric authentication method 113, and perform verification from among biometric authentication requests including coinciding biometric authentication method 113. Alternatively, the authentication unit 150 may preferentially attempt verification with biometric feature information being registered in a period from a day on which a biometric authentication request is received until several days ago. In this way, a verification speed may improve. Further, when the preferential verification described above fails, verification with all remaining pieces of the biometric feature information may be performed. Further, the authentication unit 150 may include, in an authentication result, a biometric authentication method succeeding in authentication.

Figure 8:
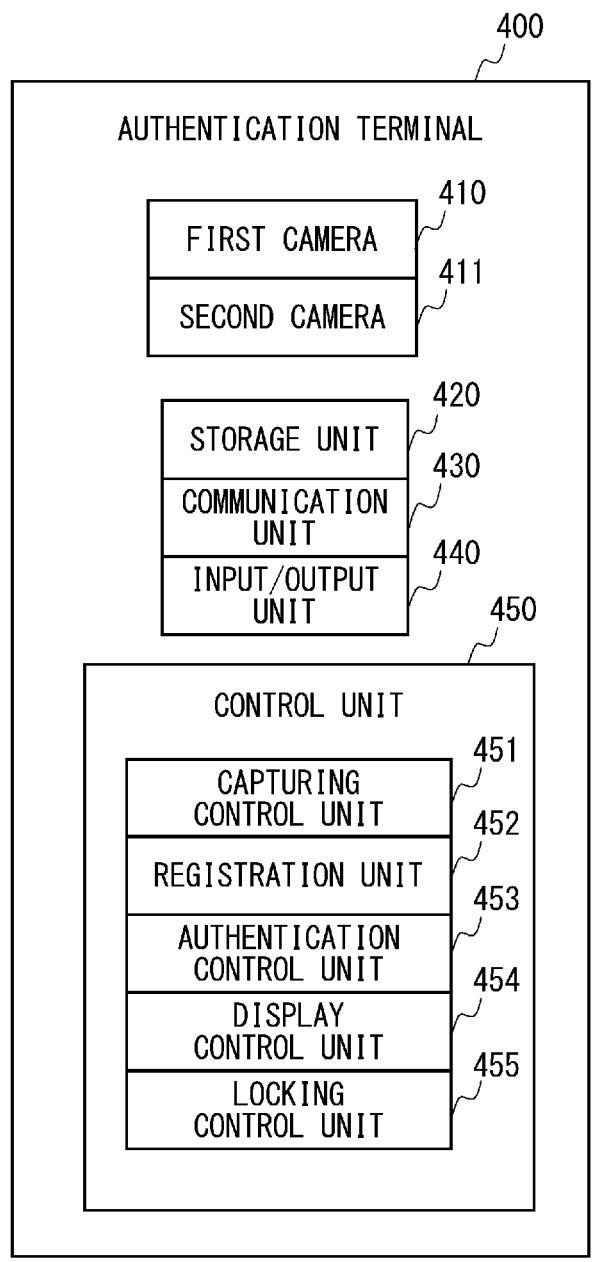
FIG. 8 is a block diagram illustrating a configuration of an authentication terminal (locking system) according to the second example embodiment.

Next, a configuration of the authentication terminal 400 will be described. FIG. 8 is a block diagram illustrating a configuration of the authentication terminal 400 according to the present second example embodiment. The authentication terminal 400 includes a first camera 410, a second camera 411, a storage unit 420, a communication unit 430, an input/output unit 440, and a control unit 450.

The first camera 410 and the second camera 411 are an image-capturing device that performs capturing in response to control of the control unit 450. In the present second example embodiment, the first camera 410 captures a face of a user, and the second camera 411 captures an iris of the user. The second camera 411 is, for example, an infrared camera that can capture an iris.

The storage unit 420 is a storage device that stores a program for achieving each function of the authentication terminal 400. The communication unit 430 is a communication interface with the network N.

The input/output unit 440 is at least a display device. Further, the input/output unit 440 may be an input/output unit including a display device and an input device. The input/output unit 440 may be able to receive an input by a line of sight, a finger gesture, or voice of a user. Further, the input/output unit 440 may be a touch panel that can receive a touch operation of a user.

The control unit 450 performs control of hardware included in the authentication terminal 400. The control unit 450 includes a capturing control unit 451, a registration unit 452, an authentication control unit 453, a display control unit 454, and a locking control unit 455.

The capturing control unit 451 controls the first camera 410 and the second camera 411, and captures a registration image or an authentication image of a user. The registration image and the authentication image captured by the first camera 410 and the second camera 411 are images respectively including at least a face area and an iris image of the user. The capturing control unit 451 outputs the registration image to the registration unit 452. Further, the capturing control unit 451 outputs the authentication image to the authentication control unit 453. Note that it is assumed herein that the first camera 410 captures a face of a user, and the second camera 411 captures an iris of the user, but the first camera 410 may capture both of the face and the iris of the user.

The registration unit 452 transmits a biometric information registration request including the registration image to the authentication device 100 via the network N. The registration unit 452 may include a biometric authentication method in the biometric information registration request.

The authentication control unit 453 transmits a biometric authentication request including the authentication image to the entry control device 200 via the network N. At this time, the authentication control unit 453 transmits, to the entry control device 200, region identification information that identifies a region where the authentication terminal 400 is installed and a capturing time of the authentication image (face image and iris image) in the biometric authentication request.

Further, the authentication control unit 453 may transmit, to the entry control device 200, terminal identification information that identifies the authentication terminal 400 instead of the region identification information in the biometric authentication request. In that case, the entry control device 200 stores, in advance, the terminal identification information about the authentication terminal 400 and the region identification information about the installation place of the authentication terminal 400 in association with each other in the storage unit 210. In this way, the entry control device 200 can refer to the storage unit 210, based on the terminal identification information included in the received biometric authentication request, and acquire the region identification information about the region where the authentication terminal 400 is installed.

The authentication control unit 453 receives a biometric authentication result, and outputs the biometric authentication result to the display control unit 454 and the locking control unit 455.

The display control unit 454 receives various types of screen data from the entry control device 200 via the network N, and displays the received screen data on the input/output unit 440. For example, the display control unit 454 displays a display content according to the biometric authentication result on the input/output unit 440.

When the locking control unit 455 receives an unlocking instruction from the entry control device 200 via the network N, the locking control unit 455 outputs the unlocking instruction to the associated gate device 600. Similarly, when the locking control unit 455 receives a locking instruction from the entry control device 200, the locking control unit 455 may output the locking instruction to the associated gate device 600. Further, the locking control unit 455 may receive, from the entry control device 200, a setting instruction or an unlocking instruction of a security system for each region, and output the setting instruction or the unlocking instruction to the associated security system.

Next, the caretaker terminal 300 will be described. The caretaker terminal 300 is an information terminal managed by the caretaker C1 of the apartment house 500. The caretaker terminal 300 is, for example, an information processing device such as a personal computer, a smartphone, a tablet terminal, or the like. The caretaker terminal 300 is connected to the image-capturing device 350 in a wired or wireless manner.

The image-capturing device 350 is an image-capturing device that can capture an iris image of a user. The image-capturing device 350 may be, for example, an infrared camera. Herein, the image-capturing device 350 is described as a camera that can capture a face image and an iris image of a user. The image-capturing device 350 may be mounted on the caretaker terminal 300.

The caretaker terminal 300 captures a face image and an iris image of a user by using the image-capturing device 350, and transmits the captured face image and the captured iris image to the entry control device 200. The visitor U2 can perform face authentication by using a preregistered face image in the caretaker terminal 300, and can also newly register an iris image. When the visitor U2 is an authorized user, the caretaker terminal 300 may output the fact to an input/output device (not illustrated) and the like. The caretaker terminal 300 may output, to the input/output device, a message such as "face authentication succeeds", "Mr./Ms. ○ ○ scheduled to visit room 511 from 14:00 to 16:00", and "iris image is acquired", for example. Further, the caretaker terminal 300 may output, to the input/output device, a guide that iris authentication is used at a time of entry to each room. Note that the caretaker terminal 300 may perform personal authentication of the visitor U2 by combining one or more conditions of a room number, a period in which a stay is permitted, and a visiting purpose in addition to the face authentication.

Figure 9:
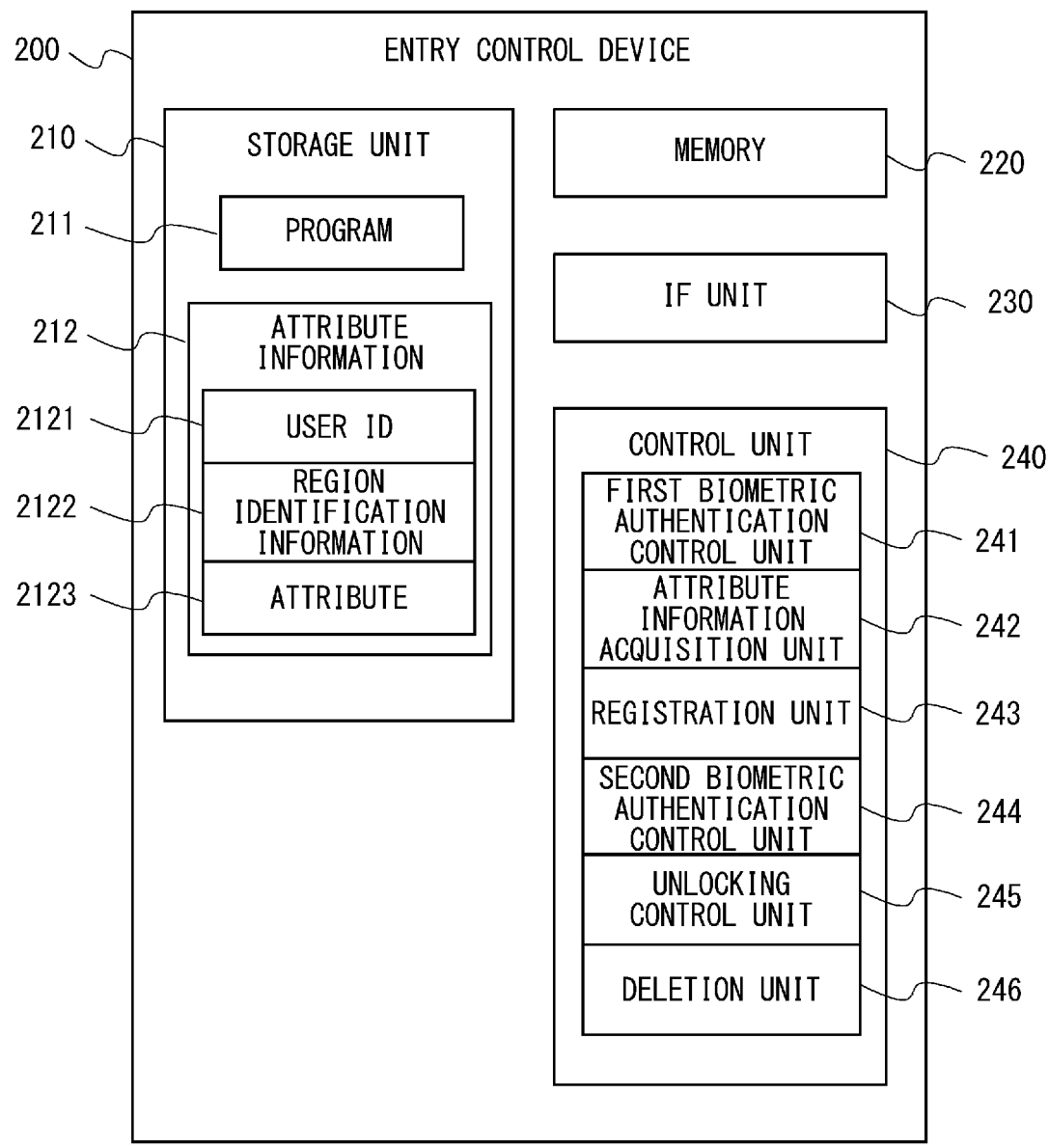
FIG. 9 is a block diagram illustrating a configuration of an entry control device according to the second example embodiment.

Next, a configuration of the entry control device 200 will be described. FIG. 9 is a block diagram illustrating the configuration of the entry control device 200. The entry control device 200 is an information processing device for controlling entry of a user (the resident U1 or the visitor U2) to a predetermined region. The entry control device 200 may be made redundant by a plurality of servers, or each functional block may be achieved by a plurality of computers. The entry control device 200 includes the storage unit 210, a memory 220, an interface (IF) unit 230, and a control unit 240.

The storage unit 210 is one example of a storage device such as a hard disk and a flash memory. The storage unit 210 stores a program 211 and attribute information 212. The program 211 is a computer program in which processing of an entry control method according to the second example embodiment is implemented.

The attribute information 212 is information that manages an attribute of a user. The attribute information 212 is associated with a user ID 2121 that identifies the user, region identification information 2122 that identifies a region, and an attribute 2123 of the user.

FIG. 10 is a diagram illustrating one example of the attribute information 212. Herein, the attribute information 212 includes a name of a user, a region name, a period in which a stay is permitted, and a visiting purpose in addition to the user ID 2121, the region identification information 2122, and the attribute 2123 described above.

The region identification information 2122 is information that identifies each of a plurality of predetermined regions. The region identification information 2122 may be, for example, a room number of a residence.

The attribute 2123 indicates a relationship between a user and the apartment house 500. The attribute information 212 may include, for example, information about whether a user is a resident of the apartment house 500 or a visitor. Further, the attribute 2123 distinguishes a user who stays in a residence of a resident for a predetermined period of time or longer, such as a housekeeper, from another visitor among visitors. Herein, a user such as a housekeeper is assumed to be an "authorized user". Further, a delivery company, a mailman, and the like who temporarily stay at an entrance and the like are assumed to be an "unauthorized user".

The attribute 2123 is set for each region being usable by a user. For example, in the example in FIG. 10, a user D is indicated as a housekeeper under a contract with a resident of a room 511 (residence 511). The user D has an attribute of an authorized user for the residence 511, but not an authorized user for a region other than the residence 511.

Further, a plurality of the attributes 2123 may be set for one user. For example, a user E illustrated in FIG. 10 is indicated as a babysitter under a contract with a resident of a room 512 (residence 512). In this case, the user E may be registered as an authorized user for not only the residence 512 but also a kids' room.

Further, as illustrated in FIG. 10, the attribute information 212 may include a period in which a stay of a user is permitted. The period in which a stay is permitted may be set based on a service provision time. For the period in which a stay is permitted, a period from a start date and time until an end date and time of the service provision period may be set, or a period including a predetermined period of time (for example, 15 minutes) before and after the service provision period may be set. In this way, even in a case where an attribute of a user is an authorized user, when the user tries to enter a predetermined region outside the period in which a stay is permitted, entry can be prevented from being permitted. Further, a starting period and an ending period of the period in which a stay is permitted may not be determined, and a predetermined period in which a stay is permitted may be determined. For example, for a housekeeper and the like who have a great number of working days, only a time in which a stay is permitted such as a predetermined period of time (for example, three hours) from an entry time may be set.

Further, as illustrated in FIG. 10, the attribute information 212 may include a visiting purpose of a user. The visiting purpose is a purpose for a user to visit the apartment house 500. The visiting purpose may indicate a service content such as "housekeeper" and "babysitter", for example.

Returning to FIG. 9, and description continues. The memory 220 is a volatile storage device such as a random access memory (RAM), and is a storage area for temporarily holding information during an operation of the control unit 540. The IF unit 230 is a communication interface with the network N.

The control unit 240 is a processor, i.e., a control device that controls each configuration of the entry control device 200. The control unit 240 reads the program 211 from the storage device 210 into the memory 220, and executes the program 211. In this way, the control unit 240 achieves a function of a first biometric authentication control unit 241, an attribute information acquisition unit 242, a registration unit 243, a second biometric authentication control unit 244, an unlocking control unit 245, and a deletion unit 246.

The first biometric authentication control unit 241 corresponds to the first biometric authentication control unit 11 in the first example embodiment. The first biometric authentication control unit 241 acquires first biometric information from a predetermined user who tries to enter a facility including a plurality of regions where entry is restricted in each of a plurality of locking systems, and controls first biometric authentication. In the present example embodiment, the first biometric authentication control unit 241 controls face authentication of the visitor U2 in the authentication terminal 400-1 and the caretaker terminal 300.

The attribute information acquisition unit 242 corresponds to the attribute information acquisition unit 12 in the first example embodiment. The attribute information acquisition unit 242 refers to the attribute information 212 and acquires attribute information about a user when the user has succeeded in the first biometric authentication.

When the face authentication of the visitor U2 succeeds in the caretaker terminal 300, the attribute information acquisition unit 242 refers to the attribute information 212 and acquires an attribute of the visitor U2. Herein, when the attribute information acquisition unit 242 receives an input of the region identification information 2122 from the visitor U2, and a content of the received input coincides with the region identification information 2122 about a predetermined region where entry of the visitor U2 is permitted in advance, the attribute information acquisition unit 242 may acquire attribute information.

For example, the visitor U2 inputs "511" being the region identification information 2122 about the residence 511 being a visit destination to the caretaker terminal 300 via the input/output device included in the caretaker terminal 300. In this case, the region identification information 2122 about a predetermined region where the visitor U2 is permitted in advance and a content of the input coincide with each other, and thus the attribute information acquisition unit 242 acquires information indicating that an attribute of the visitor U2 is an authorized user. In this way, security can be improved by receiving an input of a room number from the visitor U2.

Further, the attribute information acquisition unit 242 may more strictly perform personal authentication of the visitor U2 by using information about a contract content between the resident U1 and the visitor U2 in addition to the face authentication and an input of a room number, and may acquire attribute information.

For example, when the visitor U2 succeeds in the face authentication, the attribute information acquisition unit 242 refers to the attribute information 212 and acquires a period in which a stay of the visitor U2 is permitted. The attribute information acquisition unit 242 judges whether an execution date and time of the face authentication falls within the period in which a stay is permitted. When the execution date and time of the face authentication falls within the period in which a stay is permitted, the attribute information acquisition unit 242 acquires information indicating that an attribute of the visitor U2 is an authorized user.

Further, when the visitor U2 succeeds in the face authentication, the attribute information acquisition unit 242 may refer to the attribute information 212, acquire a visiting purpose of the visitor U2, and further perform authentication by using the acquired visiting purpose. For example, the attribute information acquisition unit 242 receives an input of a visiting purpose from the visitor U2, and judges whether selection is correct. The input may be a free input of the visitor U2, or options may be displayed on the input/output device and the like and selected by the visitor U2. When the input of the visiting purpose is correct, the attribute information acquisition unit 242 acquires information indicating that an attribute of the visitor U2 is an authorized user.

In this way, the attribute information acquisition unit 242 may acquire attribute information about the visitor U2 in response to success in the face authentication, and may additionally perform the personal authentication by combining one or more conditions of a room number, a period in which a stay is permitted, and a visiting purpose. Note that such personal authentication may be performed in a terminal other than the caretaker terminal 300. For example, similar processing may be performed in the authentication terminal 400-1. In this way, even in a case where the visitor U2 and the resident U1 has already made a contract, when the visitor U2 visits on a date and time and for a purpose different from those in a contract content, the visitor U2 can be handled in a stage before entry to the entrance 501. For example, the authentication terminal 400-1 may display, for the visitor U2, a fact that entry to the entrance 501 is not permitted on the input/output unit 440, and the like.

The registration unit 243 corresponds to the registration unit 13 in the first example embodiment. The registration unit 243 registers, in association with a patron of a facility in a storage device, second biometric information acquired from a user when an attribute of the user is an authorized user who is permitted in advance by the patron to enter a predetermined region of the facility. Herein, the patron of the facility may be a person who has authority to permit entry of a user to a predetermined region. The patron of the facility is, for example, a resident, a caretaker, a management company, or the like of the apartment house 500. Herein, the resident U1 who has made a contract with the visitor U2 corresponds to the patron of the facility.

The visitor U2 captures an iris by using the image-capturing device 350 with the caretaker C1 present. The caretaker terminal 300 acquires an iris image captured by the image-capturing device 350 in response to an operation of the caretaker C1, and transmits the iris image to the entry control device 200. The registration unit 243 receives the transmitted iris image, sets a biometric authentication method to iris authentication, and registers the iris image as biometric information about the visitor U2 in the authentication device 100. Herein, a face image (first biometric information) of the visitor U2 is registered in advance in the authentication device 100. The registration unit 243 registers the registered face information about the visitor U2 and the iris information (second biometric information) acquired from the caretaker terminal 300 in association with each other in the authentication device 100. In this way, the face information and the iris information about the visitor U2 are stored in the authentication device 100, and the visitor U2 can use the face authentication and the iris authentication in order to enter a predetermined region permitted to be entered in the apartment house 500.

Further, the entry control device 200 stores the visitor U2 and the resident U1 in the attribute information 212 in association with each other by using the user ID 2121 and the region identification information 2122. Therefore, the entry control device 200 can manage not only the face information but also the iris information in association with the visitor U2 and the resident U1.

The second biometric authentication control unit 244 corresponds to the second biometric authentication control unit 14 in the first example embodiment. The second biometric authentication control unit 244 acquires biometric information including second biometric information from a user when the user enters a predetermined region permitted in advance to be entered. The second biometric authentication control unit 244 controls second biometric authentication using the acquired biometric information.

As described above, when registration of an iris image of the visitor U2 in the authentication device 100 is completed in the registration unit 243, the visitor U2 can use the face authentication and the iris authentication in the authentication device 400 installed at an entrance of each region.

For example, in the example in FIG. 3, it is assumed that the visitor U2 moves from the entrance 501 to the residence 511 being a contract destination. The visitor U2 performs the biometric authentication by using the authentication terminal 400-2 in order to pass through the gate device 600-2 installed between the entrance 501 and the residential area 510. The authentication terminal 400-2 detects presence of the visitor U2, captures a face and an iris of the visitor U2, and transmits a biometric authentication request together with a face image and an iris image to the entry control device 200. The second biometric authentication control unit 244 receives the biometric information and the biometric authentication request, and transmits the biometric information and the biometric authentication request to the authentication device 100. The second biometric authentication control unit 244 receives an authentication result from the authentication device 100, and transmits the authentication result to the authentication terminal 400-2.

When the authentication succeeds in the authentication terminal 400-2, the gate device 600-2 is unlocked, and the visitor U2 can enter the residential area 510. Similarly in the authentication terminal 400-3 installed in front of the residence 511, the visitor U2 performs the face authentication and the iris authentication. Therefore, similarly to the authentication terminal 400-2, the second biometric authentication control unit 244 receives a biometric authentication request from the authentication terminal 400-3, and controls the second biometric authentication.

Note that, herein, the face authentication and the iris authentication are used, but the authentication may be further performed by using another authentication method. Other biometric authentication may be further combined with the face authentication and the iris authentication, or another authentication method may be used instead of the face authentication.

Further, herein, the face authentication and the iris authentication are used in both of the authentication terminal 400-2 and the authentication terminal 400-3, which is not limited thereto. The second biometric authentication control unit 244 may control the second biometric authentication by using a different authentication method according to a security level of each region. For example, the authentication can be achieved by only the iris authentication in the authentication terminal 400-2, and the face authentication and the iris authentication may be used in the authentication terminals 400-3 to 400-5. Further, conversely, the face authentication and the iris authentication are performed in the authentication terminal 400-2, and the authentication can be achieved by only the face authentication in the authentication terminals 400-3 to 400-5 similarly to the authentication terminal 400-1. In that case, the authentication terminals 400-3 to 400-5 may be a terminal not including the second camera 411. Further, a user may enter a residence by using a physical key without performing the biometric authentication. In this way, at a time of entry from the entrance 501 to the residential area 510, a cost of the authentication terminal 400 installed at an entrance of each room can be suppressed while personal authentication of a user can be more strictly performed.

Further, the present disclosure is not limited to the description above, and only the face authentication may be performed in a region having a relatively low security level as in the authentication terminal 400-1 described above. In that case, the authentication terminal 400 installed at an entrance of the region may be a terminal associated with only a necessary authentication method. For example, the authentication terminal 400-1 may not include the second camera 411.

Further, the second biometric authentication control unit 244 may perform a plurality of pieces of authentication, and set success in some of the pieces of authentication as authentication success of a user. For example, the second biometric authentication control unit 244 acquires a face image and an iris image of a user, and controls the authentication in such a way as to perform the face authentication and the iris authentication. Of the pieces of authentication, it is assumed that the face authentication fails and the iris authentication succeeds. Even in such a case, the second biometric authentication control unit 244 may set success in the second biometric authentication according to a security level of a region. In this way, for example, even when a user is wearing a mask, a probability of authentication success can be increased, and thus convenience of a user can be improved.

Returning to FIG. 9, and description continues. The unlocking control unit 245 corresponds to the unlocking control unit 15 in the first example embodiment. When a user succeeds in the second biometric authentication, the unlocking control unit 245 instructs unlocking to a locking system installed at an entrance of a predetermined region. For example, when the visitor U2 succeeds in the face authentication and the iris authentication in the authentication terminal 400-2 installed at the entrance of the residential area 510, the unlocking control unit 245 instructs unlocking to the authentication terminal 400-2.

Further, when a user succeeds in the first biometric authentication according to a security level, the unlocking control unit 245 instructs unlocking to a locking system installed at an entrance of a predetermined region. For example, in the authentication terminal 400-1 installed in front of the entrance 501, the unlocking control unit 245 instructs unlocking of the authentication terminal 400-1 only in response to success in the face authentication of the visitor U2. In this way, even when only face information about a user is registered and iris information is not registered, a certain security effect can be acquired by performing authentication in a first stage by the face information.

Figure 11:
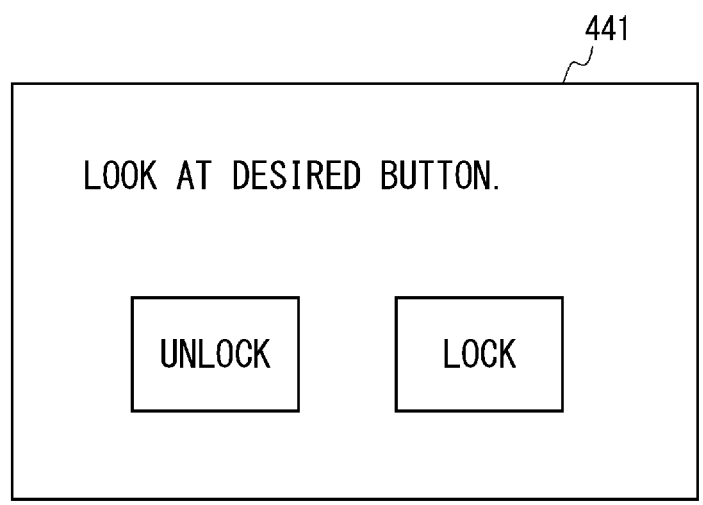
FIG. 11 is a diagram illustrating an input screen according to the second example embodiment.

Further, the unlocking control unit 245 may receive a non-contact input from a user, and instruct locking or unlocking to a locking system in response to a content of the input. The unlocking control unit 245 may display a predetermined input screen on the input/output unit 440 of the authentication terminal 400 in order to receive an input from a user. FIG. 11 is a diagram illustrating one example of a predetermined input screen 441.

As illustrated in FIG. 11, an "unlock" button and a "lock" button are displayed on the input screen 441. For example, a user turns eyes in a direction of the "unlock" button of the input screen 441. The authentication terminal 400 receives an input of a desired operation content by a user by using a line-of-sight estimation technique. The authentication terminal 400 receives an input that unlocking is desired by the user, and instructs unlocking to the gate device 600. The gate device 600 opens a lock according to the unlocking instruction. In this way, a user can enter a predetermined region only by turning eyes upon the input screen 441. Thus, even when the user holds baggage with both hands, and the like, the user can easily open a lock. Further, since contact with a touch panel and the like is not needed, it is also effective for measures for infectious disease.

Note that the unlocking control unit 245 may set a different content of the input screen 441 according to an attribute of a user. For example, for the visitor U2, only the "unlock" button may be displayed, or a "call caretaker" button or the like may be displayed. Further, the input screen 441 may be applied to the gate device 600. For example, when a user enters each room, the unlocking control unit 245 may display the input screen 441 on a display device (not illustrated) included in the gate devices 600-3 to 600-5, and receive an input from the user.

Further, the unlocking control unit 245 may perform not only control of unlocking or locking of a door and the like, but also control of setting or unlocking of a security system for each region. The security system is a crime prevention system for detecting intrusion of a suspicious person in absence of a resident. For example, when a resident exits from a residence or exits from the entrance 501, the resident performs locking of the residence and also performs setting of the security system. In this way, locking of the residence and setting of the security system can be almost simultaneously performed, thereby leading to an improvement in security.

Note that, in the description above, the entry method by the non-contact manner by using the line-of-sight estimation technique is described, but the present disclosure is not limited thereto, and the authentication terminal 400-1 may acquire an intention of a user by using a finger gesture, a voice input, and the like. Further, an intention of a user may be acquired by using a touch operation and the like on the input/output unit 440.

Returning to FIG. 9, and description continues. The deletion unit 246 deletes the iris information (second biometric information) about the visitor U2 from the authentication device 100 after a predetermined period of time has elapsed since registration of the iris information. In this way, the visitor U2 cannot enter a region that requires the iris authentication after the predetermined period of time has elapsed, and thus security of a residence and the like can be secured. The deletion unit 246 may further delete the face information (first biometric information) about the visitor U2 after a predetermined period has elapsed.

Figure 12:
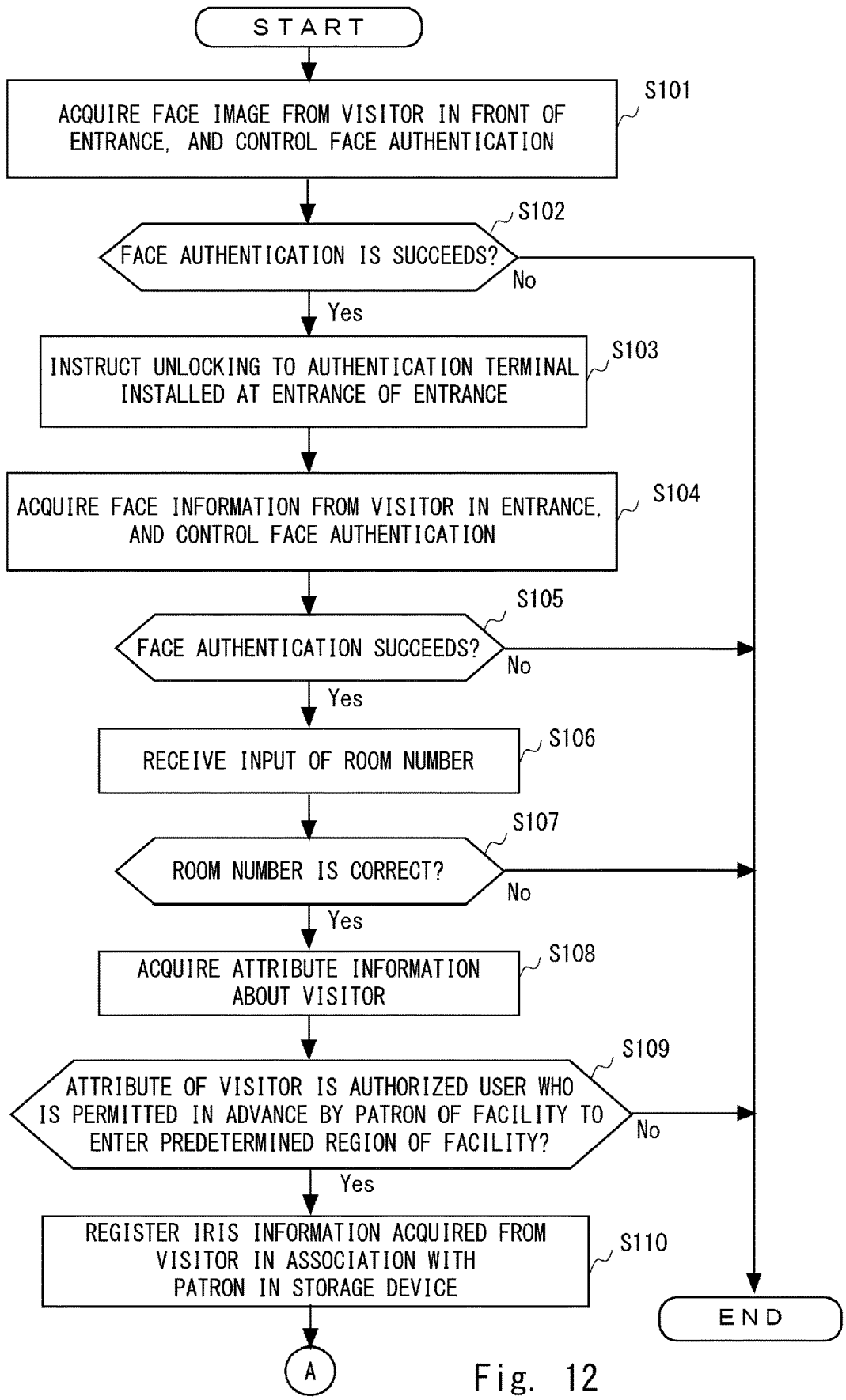
FIG. 12 is a flowchart illustrating processing performed by the entry control device according to the second example embodiment.
Figure 13:
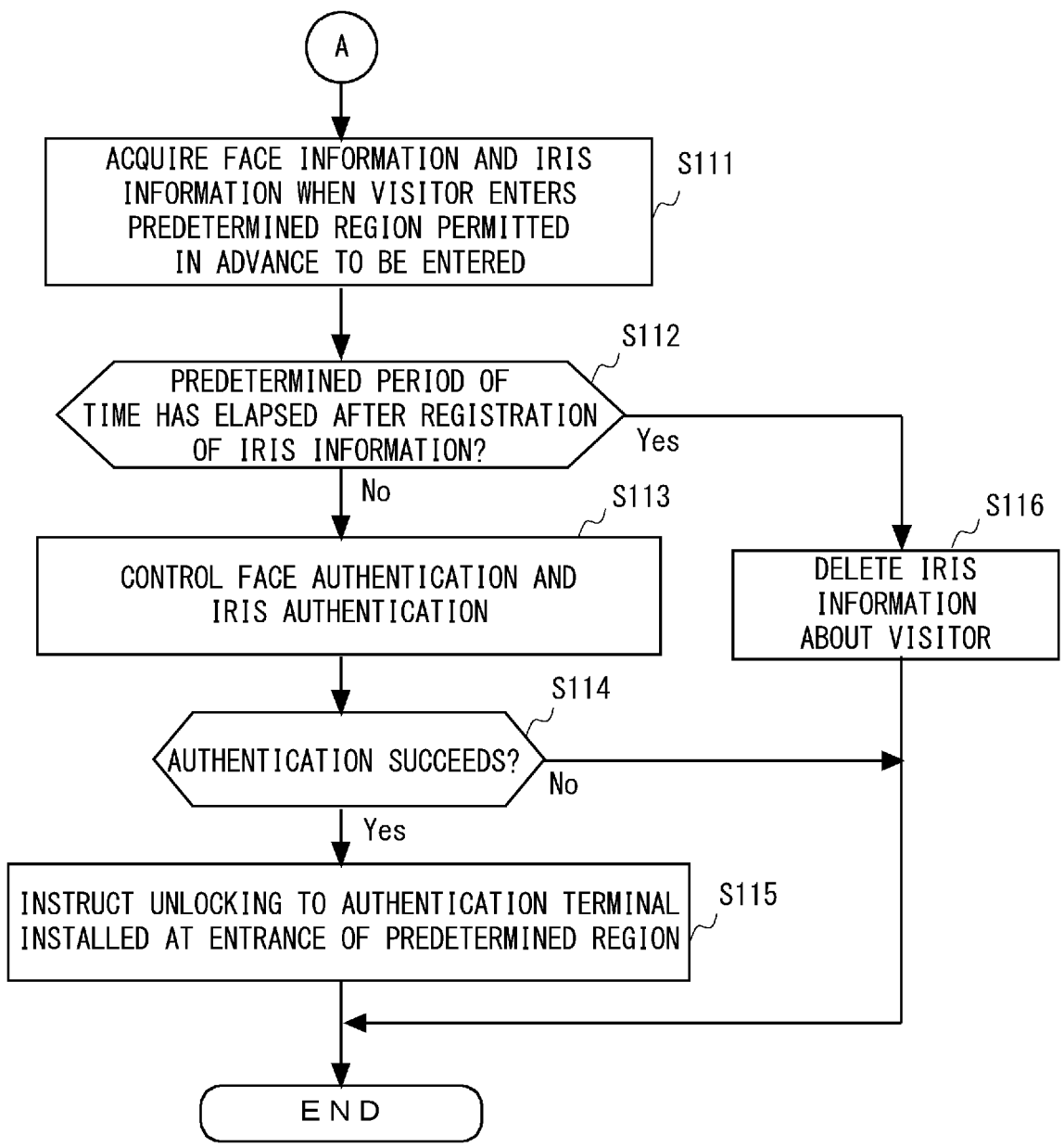
FIG. 13 is a flowchart illustrating processing performed by the entry control device according to the second example embodiment.

Next, processing performed by the entry control device 200 will be described by using FIGS. 12 and 13. FIGS. 12 and 13 are flowcharts illustrating the processing performed by the entry control device 200. It is assumed herein that a contract between the resident U1 and the visitor U2 has been completed, and the visitor U2 has already registered his/her face image.

First, by using FIG. 12, processing since the visitor U2 visits the apartment house 500 until an iris image of the visitor U2 is registered in the authentication device 100 will be described. When the visitor U2 arrives the apartment house 500, the visitor U2 moves to the front of the authentication terminal 400-1 installed in front of the entrance 501. The authentication terminal 400-1 recognizes presence of the visitor U2 by using a human detection sensor (not illustrated), and captures a face image of the visitor U2.

The first biometric authentication control unit 241 acquires the face image of the visitor U2 from the authentication terminal 400-1, and controls face authentication (S101). The first biometric authentication control unit 241 transmits the face image to the authentication device 100, and makes a biometric authentication request.

The first biometric authentication control unit 241 receives an authentication result from the authentication device 100, and judges whether the face authentication has succeeded (S102). When the face authentication has succeeded (Yes in S102), the processing proceeds to next processing, and, when the face authentication has failed (No in S102), the processing ends. The unlocking control unit 245 instructs unlocking to the authentication terminal 400-1 (S103). In this way, the visitor U2 can enter the inside of the entrance 501.

The visitor U2 performs the face authentication by using the image-capturing device 350 and the caretaker terminal 300 with the caretaker C1 present in the entrance 501. The first biometric authentication control unit 241 acquires face information about the visitor U2, and controls the face authentication similarly to the processing in S101 (S104). Note that, for example, the caretaker C1 may display, on the caretaker terminal 300, the face image of the visitor U2 being acquired by the authentication terminal 400-1, confirm the displayed face image, and the like, and the face authentication again in the entrance 501 may be omitted.

The attribute information acquisition unit 242 receives an authentication result from the authentication device 100, and judges whether the face authentication has succeeded (S105). When the face authentication has succeeded (Yes in S105), the processing proceeds to next processing, and, when the face authentication has failed (No in S105), the processing ends. When the face authentication has succeeded, the attribute information acquisition unit 242 acquires a user ID of the determined user from the authentication device 100.

The attribute information acquisition unit 242 receives an input of a room number of a visit destination from the visitor U2 (S106). Herein, the visitor U2 inputs a room number "511" of the visit destination to the caretaker terminal 300. The attribute information acquisition unit 242 judges whether the input room number is correct (S107). When the content of the input is correct (Yes in S107), the processing proceeds to next processing, and, when the content is not correct (No in S107), the processing ends. Further, when the room number is false, an input until a predetermined number of times may be received.

The attribute information acquisition unit 242 refers to the attribute information 212, and acquires attribute information about the visitor U2, based on the user ID received from the authentication device 100 and the room number received in the processing in S106 (S108). Note that the attribute information acquisition unit 242 may not receive an input of a room number of a visit destination from the visitor U2, and may acquire attribute information about the visitor U2 in response to success (Yes in S105) in the face authentication of the visitor U2. In that case, the attribute information acquisition unit 242 refers to the attribute information 212, and acquires the attribute information about the visitor U2, based on the user ID received from the authentication device 100 (S108). Further, the attribute information acquisition unit 242 may perform personal authentication of the visitor U2 by using a period in which a stay is permitted and a visiting purpose instead of the face authentication and a room number.

The registration unit 243 judges whether an attribute of the visitor U2 is an authorized user who is permitted in advance by a patron of a facility to enter a predetermined region of the facility (S109). When the visitor U2 is the authorized user (Yes in S109), the processing proceeds to next processing, and, when the visitor U2 is not the authorized user (No in S109), the processing ends. Herein, since the visitor U2 is the authorized user who is permitted in advance to enter the residence 511 by the contract with the resident of the residence 511, the processing proceeds to the next processing.

The caretaker C1 captures an iris image of the visitor U2 by using the image-capturing device 350, and the caretaker terminal 300 transmits the iris image captured by the image-capturing device 350 to the entry control device 200. The registration unit 243 registers iris information acquired from the visitor U2 in association with the resident U1 in a storage device (S110). Specifically, the registration unit 243 transmits the iris image of the visitor U2 to the authentication device 100, and registers face information about the visitor U2 being already registered and iris information acquired from the iris image in association with each other. In this way, the entry control device 200 can manage, based on the user ID 2121, the face information and the iris information about the visitor U2 being stored in the biometric information DB 110, and region identification information (herein, a room number) about a region permitted to be entered in association with one another. Note that the region identification information may be stored together with the face information and the iris information in the biometric information DB 110.

Next, processing performed by the entry control device 200 after registration of the iris information about the visitor U2 will be described by using FIG. 13. Since the visitor U2 moves from the entrance 501 to the residential area 510 for performing business, the visitor U2 moves to the front of the authentication terminal 400-2 installed in front of the residential area 510.

Similarly to the authentication terminal 400-1, the authentication terminal 400-2 detects presence of the visitor U2, and performs authentication of the visitor U2. Herein, since a higher level of security is required than that at the entrance 501, the authentication terminal 400-2 performs the face authentication and the iris authentication on the visitor U2. Therefore, the authentication terminal 400-2 captures a face image and an iris image of the visitor U2. The second biometric authentication control unit 244 acquires face information and iris information about the visitor U2 from the authentication terminal 400-2 (S111).

The deletion unit 246 judges whether a predetermined period of time has elapsed since the iris information about the visitor U2 has been registered (S112). When the predetermined period of time has not elapsed (No in S112), the processing proceeds to next processing, and, when the predetermined period of time has elapsed (Yes in S112), the iris information about the visitor U2 is deleted (S116). Note that the deletion processing may not be immediately performed, and the caretaker C1 and the like may make a confirmation.

When time falls within the predetermined period of time since registration of the iris information (No in S112), the second biometric authentication control unit 244 controls the face authentication and the iris authentication of the visitor U2 (S113). The second biometric authentication control unit 244 transmits the face image and the iris image to the authentication device 100, makes a biometric authentication request, and acquires an authentication result.

The unlocking control unit 245 judges whether the authentication has succeeded (S114). When the authentication has succeeded (Yes in S114), the processing proceeds to next processing, and, when the authentication has failed (No in S114), the processing ends. When the authentication has succeeded (Yes in S114), the unlocking control unit 245 instructs unlocking to the authentication terminal 400-2 (S115). The authentication terminal 400-2 outputs an unlocking instruction to the gate device 600-2, and the gate device 600-2 opens a lock. In this way, the visitor U2 can enter the residential area 510.

Also in the authentication terminal 400-3 installed in front of the residence 511, the entry control device 200 performs processing similar to the authentication in the authentication terminal 400-2. When the visitor U2 succeeds in the authentication, the visitor U2 can enter the residence 511. When the visitor U2 tries the authentication in a residence other than the residence 511 by mistake, the entry control device 200 may display a fact that a room is false on the input/output unit 440, and the like.

As described above, the entry control system 1000 according to the present example embodiment can perform first biometric authentication by registering face information in advance in the authentication device 100 even when it is difficult for a visitor to register iris information in advance. The visitor can enter the inside of an apartment house by succeeding in the first biometric authentication.

Further, a visitor can use face authentication and iris authentication in an apartment house by registering iris information needed for second biometric authentication with a caretaker present. In this way, entry can be restricted by performing the face authentication and the iris authentication on the visitor at a time of entry to a residential area and each residence that require a higher security level. In registration of iris information, whether a visitor is an authorized user can be judged by using face information being registered in advance and region identification information about a region to be entered, and thus personal authentication of the visitor can be more reliably performed.

Furthermore, in the entry control system 1000, newly acquired iris information can be stored in association with face information and region identification information, and thus security can be improved. Therefore, the entry control system 1000 according to the present example embodiment can appropriately perform entry management of a user who is permitted to enter a predetermined region.

Configuration Example of Hardware

Each functional component unit of the authentication device 100, the entry control device 200, the caretaker terminal 300, the authentication terminal 400, and the gate device 600 may be achieved by hardware (for example, a hard-wired electronic circuit, and the like) that achieves each functional component unit, and may be achieved by a combination of hardware and software (for example, a combination of an electronic circuit and a program that controls the electronic circuit, and the like). Hereinafter, a case where each functional component unit of the entry control device 200 and the like is achieved by the combination of hardware and software will be further described.

Figure 14:
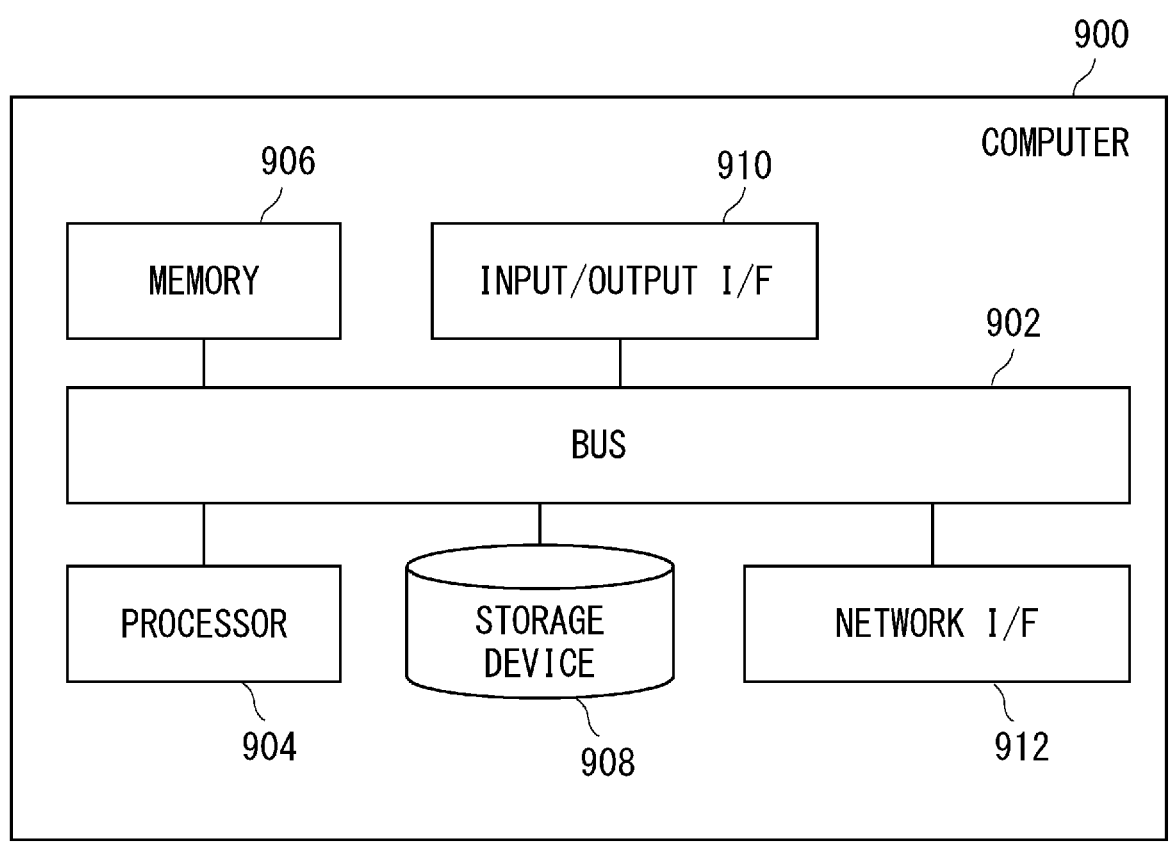
FIG. 14 is a diagram illustrating a hardware configuration example of an entry control device and the like according to the example embodiment.

FIG. 14 is a block diagram illustrating a hardware configuration of a computer 900 that achieves the entry control device 200 and the like. The computer 900 may be a dedicated computer designed for achieving the entry control device 200 and the like, and may be a general-purpose computer. The computer 900 may be a portable computer such as a smartphone and a tablet terminal.

For example, each function of the entry control device 200 and the like is achieved in the computer 900 by installing a predetermined application into the computer 900. The application described above is formed of a program for achieving each functional component unit of the entry control device 200 and the like.

The computer 900 includes a bus 902, a processor 904, a memory 906, a storage device 908, an input/output interface 910, and a network interface 912. The bus 902 is a data transmission path for allowing the processor 904, the memory 906, the storage device 908, the input/output interface 910, and the network interface 912 to transmit and receive data with one another. However, a method for connecting the processor 904 and the like to one another is not limited to bus connection.

The processor 904 is various types of processors such as a central processing unit (CPU), a graphics processing unit (GPU), or a field-programmable gate array (FPGA). The memory 906 is a main storage device achieved by using a random access memory (RAM) and the like. The storage device 908 is an auxiliary storage device achieved by using a hard disk, a solid state drive (SSD), a memory card, a read only memory (ROM), or the like.

The input/output interface 910 is an interface for connecting the computer 900 and an input/output device. For example, an input device such as a keyboard and an output device such as a display device are connected to the input/output interface 910.

The network interface 912 is an interface for connecting the computer 900 to a network. The network may be a local area network (LAN) or may be a wide area network (WAN).

The storage device 908 stores a program (a program that achieves the application described above) that achieves each functional component unit of the entry control device 200 and the like. The processor 904 reads the program onto the memory 906 and executes the program, and thus each functional component unit of the entry control device 200 and the like is achieved.

Each processor executes one or a plurality of programs including a command group for causing a computer to perform an algorithm described by using the drawings. The program may be stored by using various types of non-transitory computer-readable mediums, and may be provided to a computer. The non-transitory computer-readable medium includes various types of tangible storage mediums. Examples of the non-transitory computer-readable medium include a magnetic recording medium (for example, a flexible disk, a magnetic tape, and a hard disk drive), a magneto-optical recording medium (for example, a magneto-optical disk), an optical disk medium such as a compact disc (CD) or a digital versatile disk (DVD), and a semiconductor memory (for example, a mask ROM, a programmable ROM (PROM), an erasable PROM (EPROM), a flash ROM, and a RAM). Further, the program may be provided to the computer by various types of transitory computer-readable mediums. Examples of the transitory computer-readable medium include an electrical signal, an optical signal, and an electromagnetic wave. The transitory computer-readable medium may supply the program to the computer via a wired communication path such as an electric wire and an optical fiber or a wireless communication path.

Note that the present disclosure is not limited to the example embodiments described above, and may be appropriately modified without departing from the scope of the present disclosure.

A part or the whole of the example embodiments described above can be described as, but not limited to, the following supplementary notes.

Supplementary Note 1

An entry control device including:
a first biometric authentication control means for acquiring first biometric information from a predetermined user who tries to enter a facility including a plurality of regions where entry is restricted in each of a plurality of locking systems, and controlling first biometric authentication;
an attribute information acquisition means for acquiring attribute information about the user when the first biometric authentication has succeeded;
a registration means for registering, in association with a patron of a facility in a storage device, second biometric information acquired from the user when an attribute of the user is an authorized user who is permitted in advance by the patron to enter a predetermined region of the facility;
a second biometric authentication control means for acquiring biometric information including the second biometric information from the user when the user enters the predetermined region permitted in advance to be entered, and controlling second biometric authentication using the acquired biometric information; and
an unlocking control means for instructing unlocking to the locking system installed at an entrance of the predetermined region when the second biometric authentication has succeeded.

Supplementary Note 2

The entry control device according to supplementary note 1, wherein the registration means uses the second biometric information acquired from the user in a caretaker terminal managed by a caretaker of the facility.

Supplementary Note 3

The entry control device according to supplementary note 1 or 2, wherein the unlocking control means receives a non-contact input from the user, and instructs locking or unlocking to the locking system in response to a content of the input.

Supplementary Note 4

The entry control device according to any one of supplementary notes 1 to 3, wherein, when the attribute information acquisition means receives an input of region identification information that identifies the plurality of regions from the user, and a content of the input coincides with region identification information about a predetermined region where entry of the user is permitted in advance, the attribute information acquisition means acquires the attribute information.

Supplementary Note 5

The entry control device according to any one of supplementary notes 1 to 4, wherein, when the user has succeeded in the first biometric authentication, the unlocking control means instructs unlocking to the locking system installed at an entrance of a region where the second biometric information is acquired.

Supplementary Note 6

The entry control device according to any one of supplementary notes 1 to 5, further including a deletion means for deleting the second biometric information after a predetermined period of time has elapsed since registration of the second biometric information.

Supplementary Note 7

An entry control system including:
a plurality of locking systems installed at an entrance of each of a plurality of regions and configured to restrict entry; and
an entry control device, wherein
the entry control device includes
a first biometric authentication control means for acquiring first biometric information from a predetermined user who tries to enter a facility including a plurality of regions where entry is restricted in each of a plurality of locking systems, and controlling first biometric authentication, an attribute information acquisition means for acquiring attribute information about the user when the first biometric authentication has succeeded, a registration means for registering, in association with a patron of a facility in a storage device, second biometric information acquired from the user when an attribute of the user is an authorized user who is permitted in advance by the patron to enter a predetermined region of the facility, a second biometric authentication control means for acquiring biometric information including the second biometric information from the user when the user enters the predetermined region permitted in advance to be entered, and controlling second biometric authentication using the acquired biometric information, and an unlocking control means for instructing unlocking to the locking system installed at an entrance of the predetermined region when the second biometric authentication has succeeded.

Supplementary Note 8

The entry control system according to supplementary note 7, wherein the registration means uses the second biometric information acquired from the user in a caretaker terminal managed by a caretaker of the facility.

Supplementary Note 9

An entry control method including,
by a computer:
acquiring first biometric information from a predetermined user who tries to enter a facility including a plurality of regions where entry is restricted in each of a plurality of locking systems, and controlling first biometric authentication;
acquiring attribute information about the user when the first biometric authentication has succeeded;
registering, in association with a patron of a facility in a storage device, second biometric information acquired from the user when an attribute of the user is an authorized user who is permitted in advance by the patron to enter a predetermined region of the facility;
acquiring biometric information including the second biometric information from the user when the user enters the predetermined region permitted in advance to be entered, and controlling second biometric authentication using the acquired biometric information; and
instructing unlocking to the locking system installed at an entrance of the predetermined region when the second biometric authentication has succeeded.

Supplementary Note 10

A non-transitory computer-readable medium storing an entry control program causing a computer to execute:
first biometric authentication control processing of acquiring first biometric information from a predetermined user who tries to enter a facility including a plurality of regions where entry is restricted in each of a plurality of locking systems, and controlling first biometric authentication;
attribute information acquisition processing of acquiring attribute information about the user when the first biometric authentication has succeeded;
registration processing of registering, in association with a patron of a facility in a storage device, second biometric information acquired from the user when an attribute of the user is an authorized user who is permitted in advance by the patron to enter a predetermined region of the facility;
second biometric authentication control processing of acquiring biometric information including the second biometric information from the user when the user enters the predetermined region permitted in advance to be entered, and controlling second biometric authentication using the acquired biometric information; and
unlocking control processing of instructing unlocking to the locking system installed at an entrance of the predetermined region when the second biometric authentication has succeeded.

REFERENCE SIGNS LIST

10 ENTRY CONTROL DEVICE
11 FIRST BIOMETRIC AUTHENTICATION CONTROL UNIT
12 ATTRIBUTE INFORMATION ACQUISITION UNIT
13 REGISTRATION UNIT
14 SECOND BIOMETRIC AUTHENTICATION CONTROL UNIT
15 UNLOCKING CONTROL UNIT
100 AUTHENTICATION DEVICE
110 BIOMETRIC INFORMATION DB
111 USER ID
112 BIOMETRIC FEATURE INFORMATION
120 DETECTION UNIT
130 FEATURE POINT EXTRACTION UNIT
140 REGISTRATION UNIT
150 AUTHENTICATION UNIT
200 ENTRY CONTROL DEVICE
210 STORAGE UNIT
211 PROGRAM
212 ATTRIBUTE INFORMATION
2121 USER ID
2122 REGION IDENTIFICATION INFORMATION
2123 ATTRIBUTE
220 MEMORY
230 IF UNIT
240 CONTROL UNIT
241 FIRST BIOMETRIC AUTHENTICATION CONTROL UNIT
242 ATTRIBUTE INFORMATION ACQUISITION UNIT
243 REGISTRATION UNIT
244 SECOND BIOMETRIC AUTHENTICATION CONTROL UNIT
245 UNLOCKING CONTROL UNIT
246 DELETION UNIT
300 CARETAKER TERMINAL
350 IMAGE-CAPTURING DEVICE
400, 400-1 TO 400-5 AUTHENTICATION TERMINAL
410 FIRST CAMERA
411 SECOND CAMERA
420 STORAGE UNIT
430 COMMUNICATION UNIT
440 INPUT/OUTPUT UNIT
441 INPUT SCREEN
450 CONTROL UNIT
451 CAPTURING CONTROL UNIT
452 REGISTRATION UNIT
453 AUTHENTICATION CONTROL UNIT

454 DISPLAY CONTROL UNIT
455 LOCKING CONTROL UNIT
500 APARTMENT HOUSE
501 ENTRANCE
510 RESIDENTIAL AREA
511 TO 513 RESIDENCE
540 CONTROL UNIT
600, 600-1 TO 600-5 GATE DEVICE
900 COMPUTER
902 BUS
904 PROCESSOR
906 MEMORY
908 STORAGE DEVICE
910 INPUT/OUTPUT INTERFACE
912 NETWORK INTERFACE
1000 ENTRY CONTROL SYSTEM
N NETWORK
U1 RESIDENT
U2 VISITOR
C1 CARETAKER

What is claimed is:

1. A control system comprising:
a plurality of locking systems installed at an entrance of each of a plurality of regions and configured to restrict entry; and
a control device comprising:
at least one memory storing instructions, and
at least one processor configured to execute the instructions to:
acquire first face information from a user,
verify the first face information with second face information registered in advance,
acquire, based on the verification of the first face information being successful, attribute information of the user registered in association with the second face information, and
register the attribute information and iris information acquired from the user in association with each other,
wherein the at least one processor is further configured to execute the instructions to acquire the iris information based on the attribute information satisfying a condition.

2. A control device comprising:
at least one memory storing instructions; and
at least one processor configured to execute the instructions to:
acquire first face information from a user;
verify the first face information with second face information registered in advance;
acquire, based on the verification of the first face information being successful, attribute information of the user registered in association with the second face information; and
register the attribute information and iris information acquired from the user in association with each other,
wherein the at least one processor is further configured to execute the instructions to acquire the iris information based on the attribute information satisfying a condition.

3. The control device according to claim 2, wherein the at least one processor is further configured to execute the instructions to register the attribute information and the iris information based on the attribute information satisfying a condition.

4. The control device according to claim 2, wherein the attribute information comprises at least one of a room number, a period of possible stay, or a purpose of visit.

5. The control device according to claim 2, wherein the at least one processor is further configured to execute the instructions to:
acquire, based on the user entering a region which the user is permitted to enter in advance, the iris information from an authentication terminal installed at an entrance of the region and control iris authentication using the acquired iris information; and
instruct, based on the iris authentication being successful, a locking system installed at the entrance of the region to unlock.

6. The control device according to claim 5, wherein the at least one processor is further configured to execute the instructions to receive a non-contact input from the user, and instruct locking or unlocking to the locking system in response to a content of the input.

7. The control device according to claim 2, wherein the at least one processor is further configured to execute the instructions to acquire the first face information from an authentication terminal installed at an entrance of a facility and control face authentication.

8. The control device according to claim 7, wherein the at least one processor is further configured to execute the instructions to, based on the user succeeding in the face authentication, instruct unlocking to a locking system installed at an entrance of a region where the iris information is acquired.

9. The control device according to claim 2, wherein the at least one processor is further configured to execute the instructions to use the iris information acquired from the user in a caretaker terminal managed by a caretaker of a facility.

10. The control device according to claim 2, wherein the at least one processor is further configured to execute the instructions to, based on receiving an input of region identification information that identifies a plurality of regions from the user, and based on a content of the input coinciding with region identification information about a predetermined region where entry of the user is permitted in advance, acquire the attribute information.

11. The control device according to claim 2, wherein the at least one processor is further configured to execute the instructions to delete the iris information after a predetermined period of time has elapsed since registration of the iris information.

12. A control method comprising,
by a computer:
acquiring first face information from a user;
verifying the first face information with second face information registered in advance;
acquiring, based on the verification of the first face information being successful, attribute information of the user registered in association with the second face information; and
registering the attribute information and iris information acquired from the user in association with each other,
wherein the control method further comprises acquiring the iris information based on the attribute information satisfying a condition.

* * * * *